(12) United States Patent
Shimozono

(10) Patent No.: US 9,545,964 B2
(45) Date of Patent: Jan. 17, 2017

(54) CRAWLER TRAVELING DEVICE AND ELASTIC CRAWLER

(75) Inventor: Nobuo Shimozono, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 153 days.

(21) Appl. No.: 14/009,375

(22) PCT Filed: Apr. 5, 2012

(86) PCT No.: PCT/JP2012/059415
§ 371 (c)(1),
(2), (4) Date: Oct. 2, 2013

(87) PCT Pub. No.: WO2012/137887
PCT Pub. Date: Oct. 11, 2012

(65) Prior Publication Data
US 2014/0042801 A1    Feb. 13, 2014

(30) Foreign Application Priority Data

Apr. 5, 2011    (JP) .................................. 2011-083536

(51) Int. Cl.
*B62D 55/00* (2006.01)
*B62D 55/24* (2006.01)
(Continued)

(52) U.S. Cl.
CPC .............. *B62D 55/24* (2013.01); *B62D 55/12* (2013.01); *B62D 55/135* (2013.01); *B62D 55/244* (2013.01)

(58) Field of Classification Search
CPC ......... B62D 55/24; B62D 55/12; B62D 55/00; B60B 11/10
(Continued)

(56) References Cited

U.S. PATENT DOCUMENTS 4,961,395 A * 10/1990 Coast ............................ 305/137
5,131,731 A *  7/1992 Johnson ........................ 305/193
(Continued)

FOREIGN PATENT DOCUMENTS

CN    101380977 A    3/2009
JP    49-061233 U    9/1972
(Continued)

OTHER PUBLICATIONS

International Search Report for PCT/JP2012/059415, dated Jul. 3, 2012.
Communication dated Apr. 20, 2015, issued by the State Intellectual Property Office of the People's Republic of China in corresponding Japanese Application No. 201280016750.7.

*Primary Examiner* — Hau Phan
(74) *Attorney, Agent, or Firm* — Sughrue Mion, PLLC

(57) ABSTRACT

A crawler traveling device includes a sprocket and a rubber crawler. The sprocket is provided with a wheel portion that is mounted to a driving axle and tooth portions. The tooth portions are provided at side portions of the wheel portion, spaced apart in a sprocket circumferential direction. The rubber crawler is provided with a rubber body that is wrapped round the sprocket, a wheel portion support face that is provided at an inner periphery portion of the rubber body, and engaging recess portions. The engaging recess portions are provided, spaced apart in a crawler peripheral direction, at each of two crawler width direction side portions of the inner periphery portion to sandwich the wheel portion support face. The engaging recess portions are recessed toward the crawler outer side and the tooth portions can be inserted into and engaged with the engaging recess portions.

4 Claims, 15 Drawing Sheets

(51) Int. Cl.
*B62D 55/12* (2006.01)
*B62D 55/135* (2006.01)

(58) Field of Classification Search
USPC .............. 305/177, 178, 145, 165, 182, 173, 194,305/174
See application file for complete search history.

(56) References Cited

U.S. PATENT DOCUMENTS

| | | | |
|---|---|---|---|
| 5,593,218 A * | 1/1997 | Katoh et al. | 305/174 |
| 5,632,537 A * | 5/1997 | Yoshimura et al. | 305/173 |
| 6,422,666 B2 * | 7/2002 | Choi | 305/178 |
| 6,869,153 B2 * | 3/2005 | Wright et al. | 305/169 |
| 7,201,457 B2 * | 4/2007 | Katoh et al. | 305/194 |
| 7,226,137 B2 * | 6/2007 | Fornes | 305/143 |
| 7,296,862 B2 * | 11/2007 | Albright et al. | 305/145 |
| 7,300,119 B2 * | 11/2007 | Ueno | 305/165 |
| 7,425,044 B2 * | 9/2008 | Soucy et al. | 305/178 |

FOREIGN PATENT DOCUMENTS

| | | |
|---|---|---|
| JP | 06-263067 A | 9/1994 |
| JP | 09-301227 A | 11/1997 |
| JP | 11-198871 A | 7/1999 |
| JP | 2009-078796 A | 4/2009 |

* cited by examiner

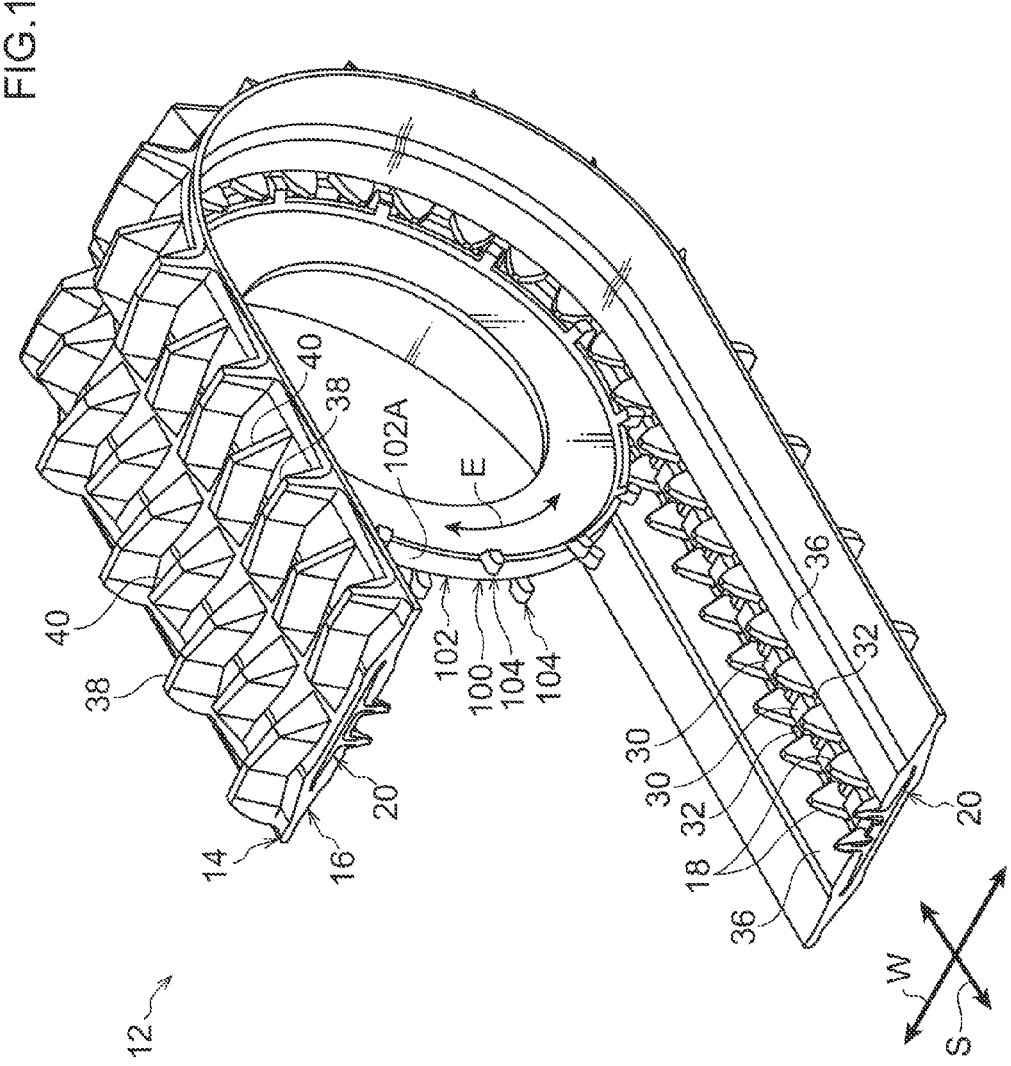

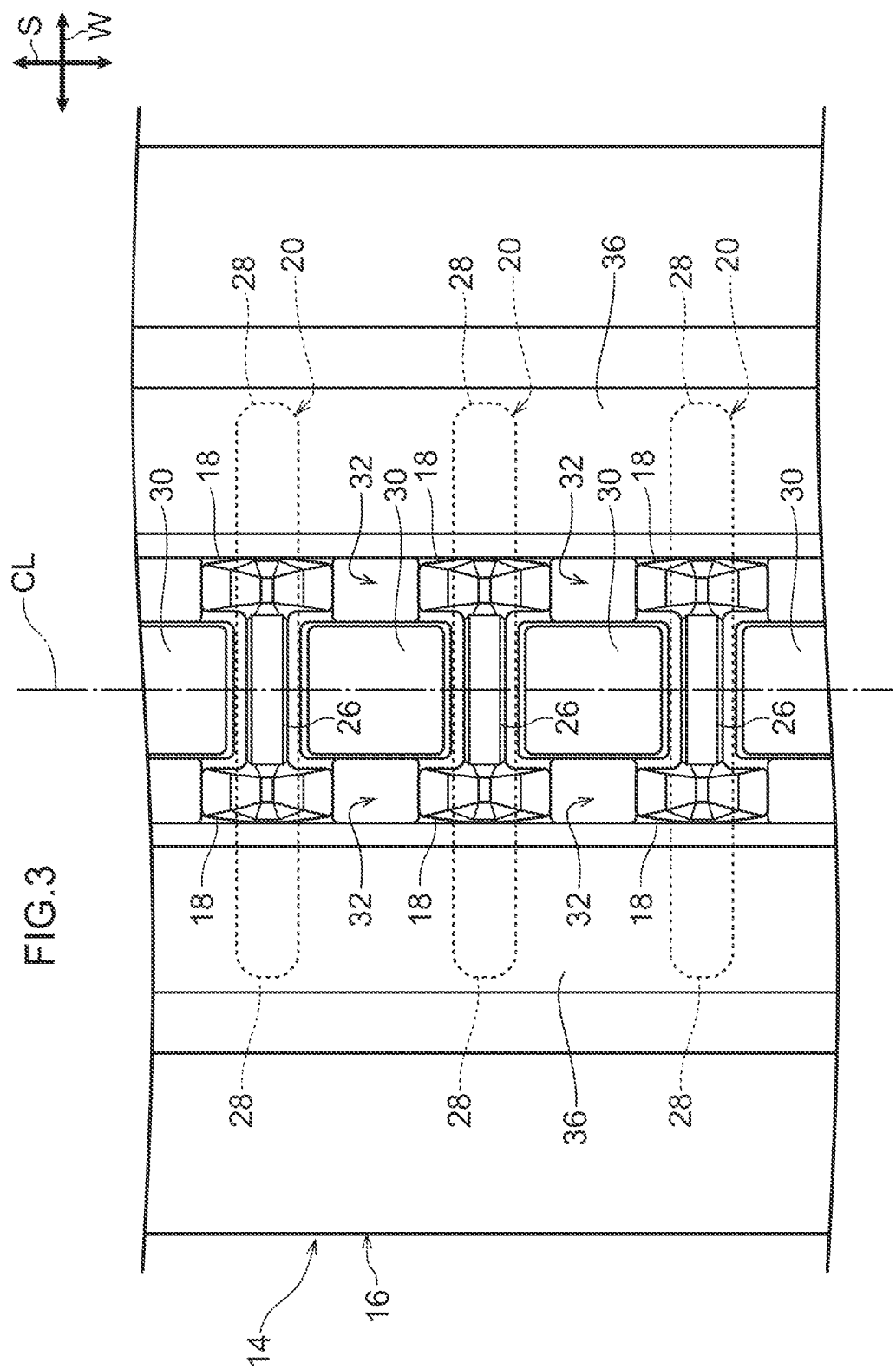

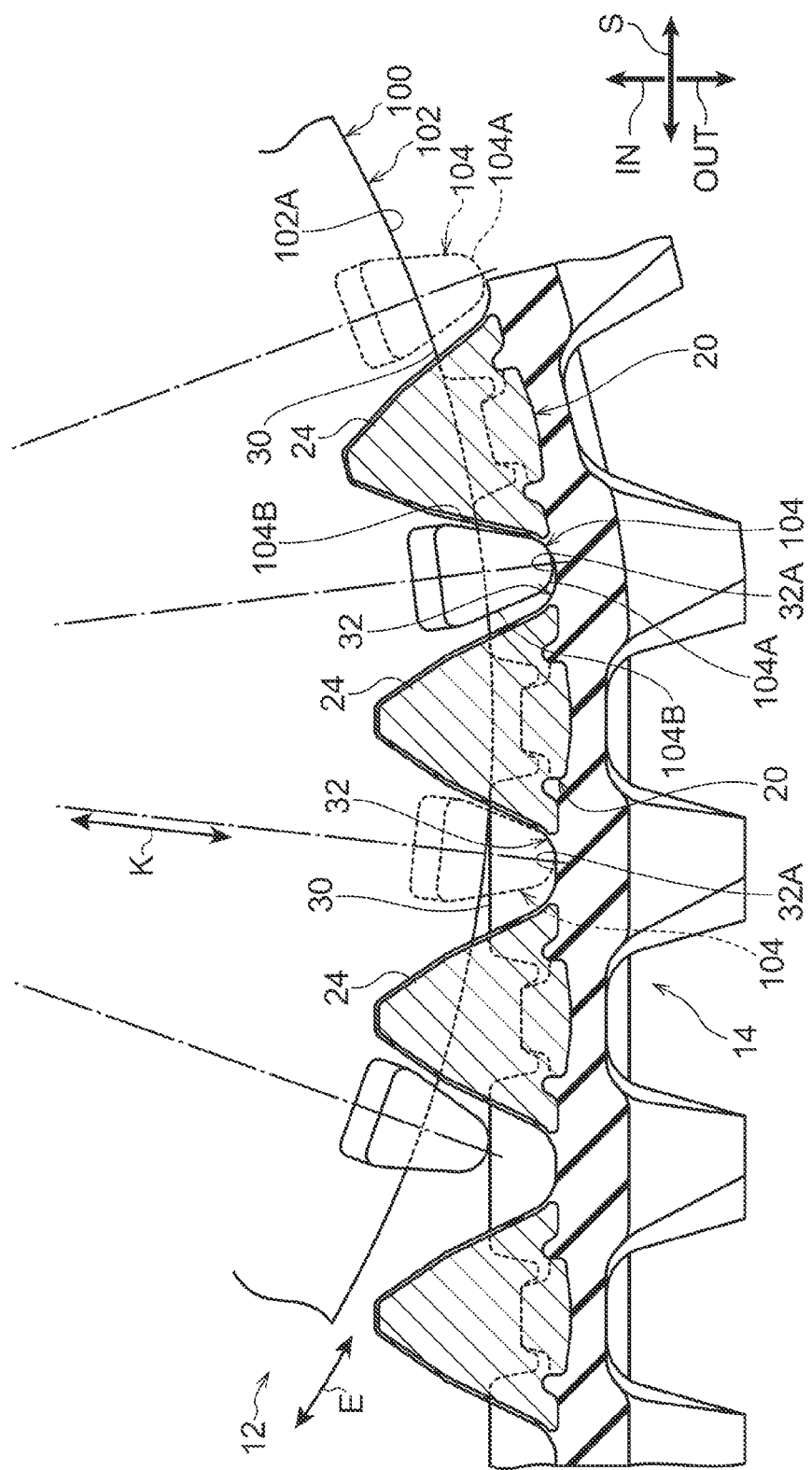

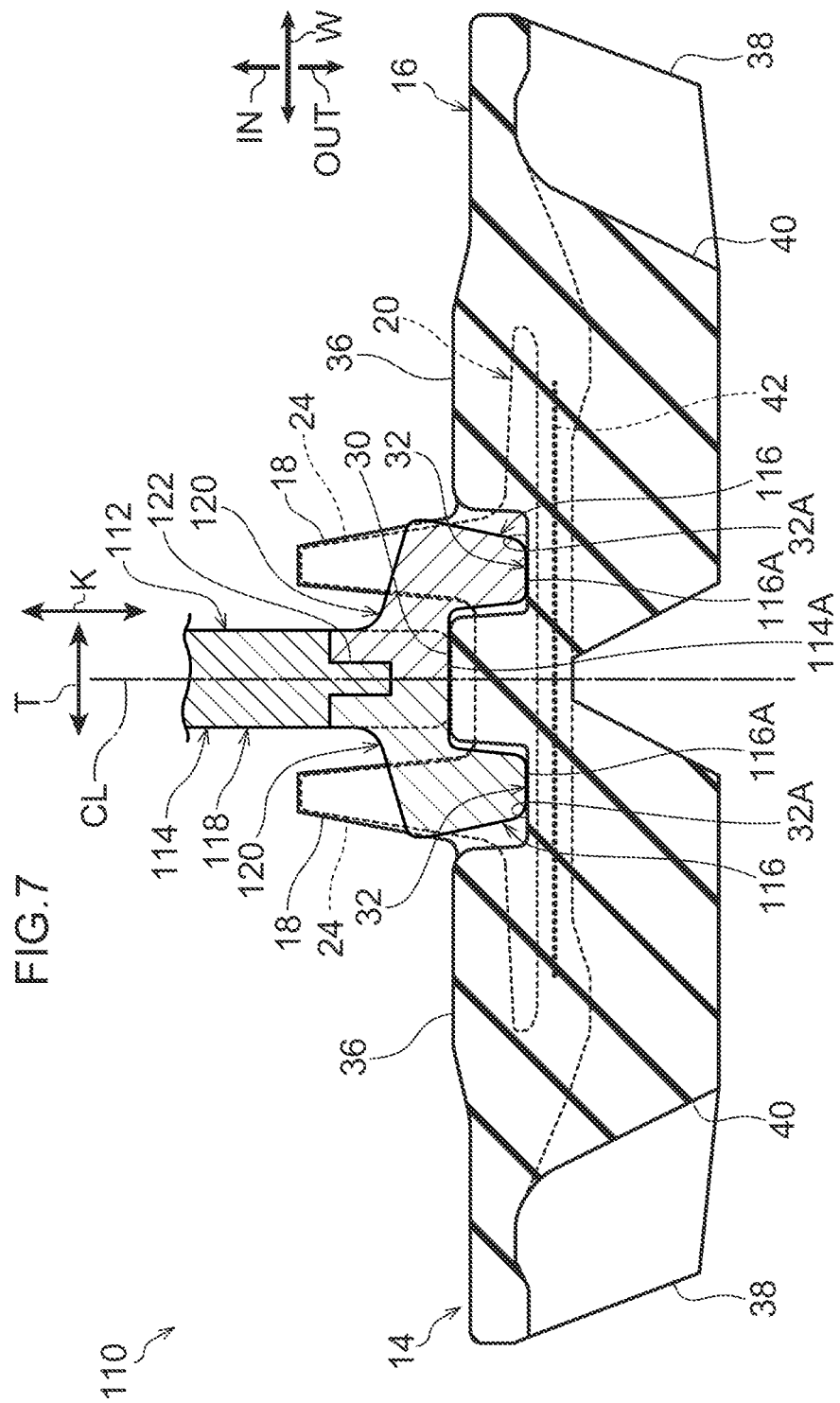

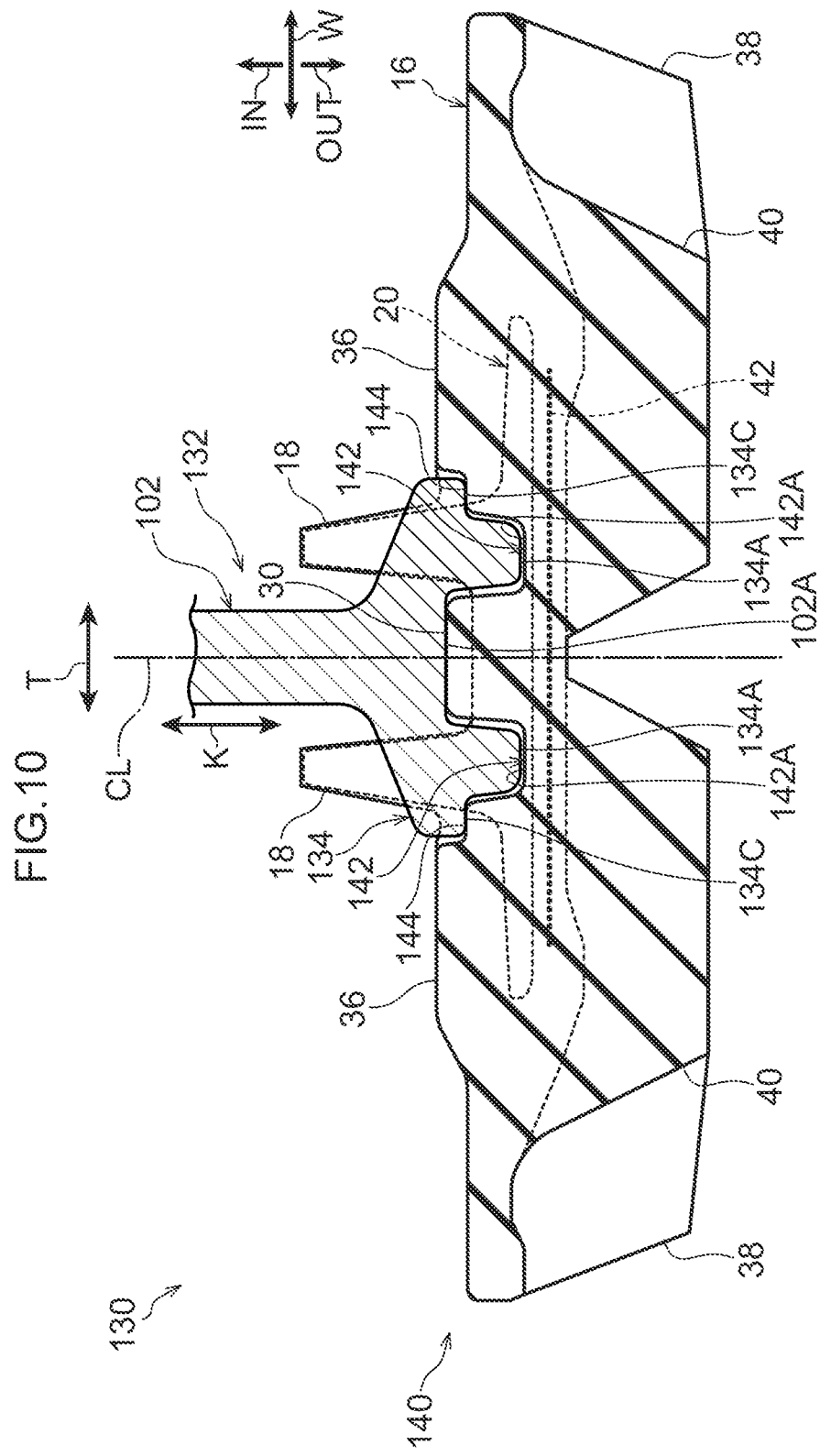

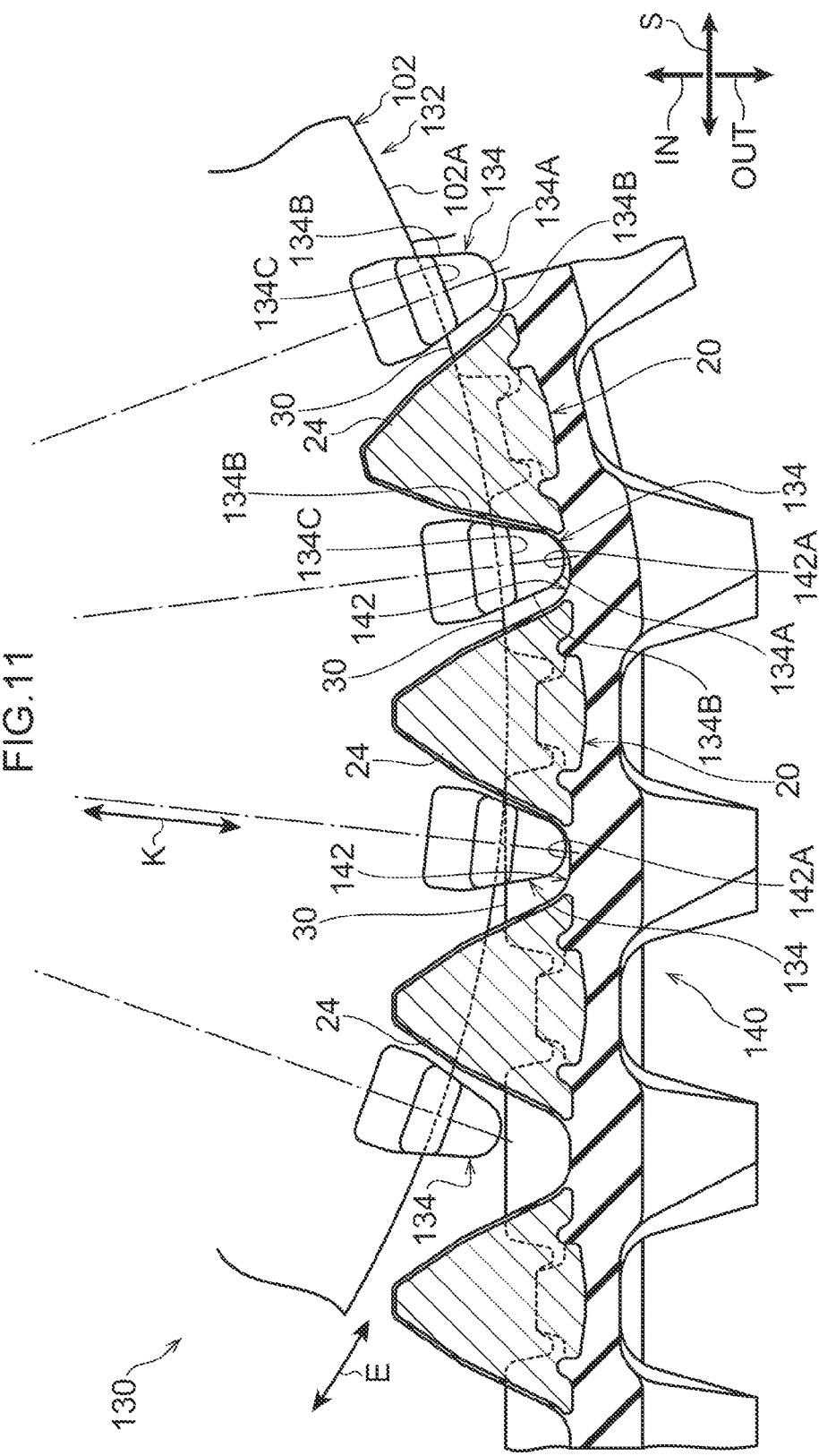

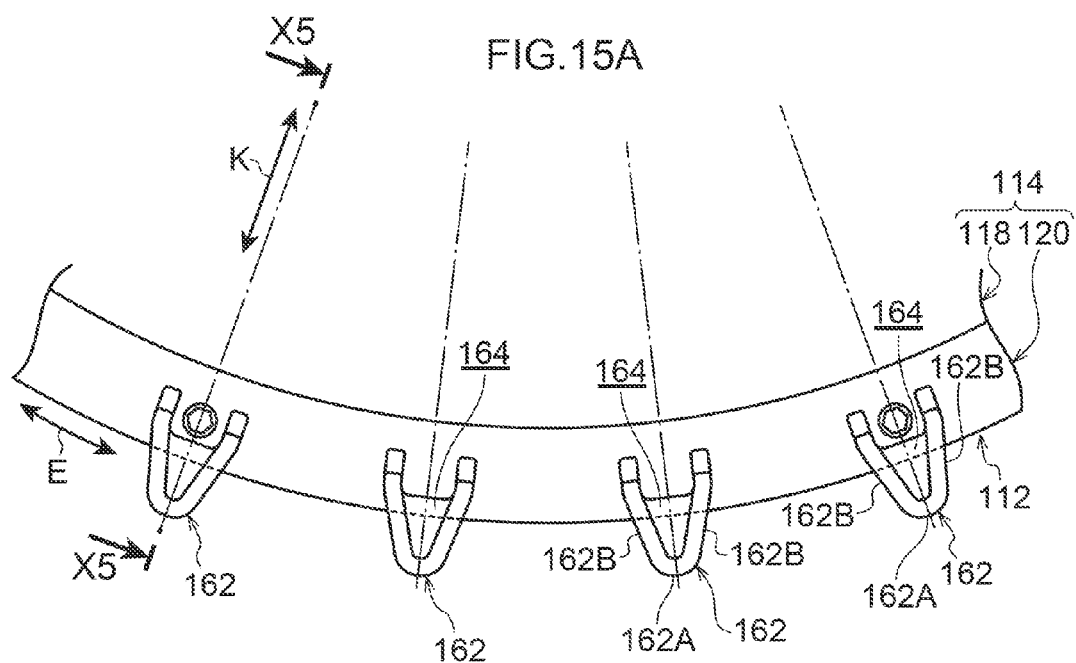
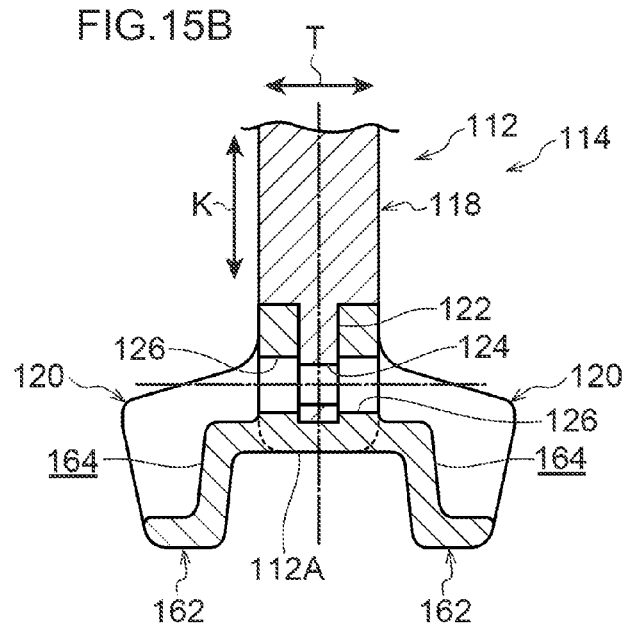

CRAWLER TRAVELING DEVICE AND ELASTIC CRAWLER

CROSS REFERENCE TO RELATED APPLICATIONS

This is a National Stage of International Application No. PCT/JP2012/059415, filed Apr. 5, 2012, claiming priority from Japanese Patent Application No. 2011-083536, filed Apr. 5, 2011, the contents of all of which are incorporated herein by reference in their entirety.

TECHNICAL FIELD

The present invention relates to a crawler traveling device and an elastic crawler.

BACKGROUND ART

Heretofore, crawler traveling devices have come to be widely used for traveling parts of agricultural machinery, construction machinery, civil engineering machinery and the like. A crawler traveling device of this kind is structured by a driving wheel, an idler wheel and track rollers, and an endless-shaped elastic crawler that is wrapped round these wheels.

These crawler traveling devices include a crawler traveling device (for example, Japanese Patent Application Laid-Open (JP-A) No. H11-198871) in which taper-shaped drive protrusions are formed at an inner periphery portion of a rubber crawler, at constant intervals in a peripheral direction. Circular rod-shaped drive pins protrude from side face edge portions of a driving wheel and push against angled faces of the drive protrusions. Thus, driving force is transmitted to the rubber crawler.

SUMMARY OF INVENTION

Technical Problem

In a crawler traveling device of the type in which circular rod-shaped drive pins push against angled faces of taper-shaped drive protrusions to transmit driving force to a rubber crawler as in JP-A No. H11-198871, there is a possibility that a phenomenon known as "jumping" may occur, in which, when driving force is inputted, a drive pin moves along the angled face of a drive protrusion and rides over the drive protrusion. To suppress occurrences of this jumping phenomenon, the height of the drive protrusions of this crawler traveling device is increased. However, when the height of the drive protrusions is increased, the weight of the rubber crawler, and thus the weight of the overall device, becomes heavier. An object of the present invention is to provide a crawler traveling device and an elastic crawler that both suppress jumping at a driving wheel and suppress an increase in weight.

Solution to Problem

A crawler traveling device according to a first aspect of the present invention includes: a driving wheel provided with a wheel portion mounted to a driving axle, and tooth portions that are provided, spaced apart in a circumferential direction, at side portions of the wheel portion, the tooth portions protruding toward a radial direction outer side relative to an outer periphery face of the wheel portion; and an elastic crawler provided with an elastic body in an endless shape that is wrapped round the driving wheel, a wheel portion support face that is provided at an inner periphery portion of the elastic body and supports the wheel portion, and engaging recess portions that are provided, spaced apart in a length direction, at both width direction sides of the inner periphery portion to sandwich the wheel portion support face, and that are recessed toward the outer periphery side, the tooth portions being inserted into and engaged with the engaging recess portions.

In the crawler traveling device according to the first aspect of the present invention, when the driving wheel turns in a state in which the tooth portions of the driving wheel are inserted into and engaged with the engaging recess portions of the elastic crawler, driving force is transmitted to the elastic body wrapped round the driving wheel (i.e., the elastic crawler).

In this crawler traveling device, because the tooth portions of the driving wheel are inserted into and engaged with the engaging recess portions of the elastic crawler, the state of engagement between the tooth portions of the driving wheel and the engaging recess portions of the elastic crawler may be maintained even though drive protrusions are not increased in height as in, for example, a crawler traveling device of the type in which circular rod-shaped drive pins (tooth portions) push against angled faces of taper-shaped drive protrusions of an elastic crawler. That is, compared to the above-mentioned type of crawler traveling device in which drive pins push against drive protrusions, the crawler traveling device of the first aspect may suppress jumping at the driving wheel while suppressing an increase in weight of the elastic crawler.

Due thereto, according to the crawler traveling device in accordance with the first aspect of the present invention, both jumping at the driving wheel may be suppressed and an increase in weight may be suppressed.

In a crawler traveling device according to a second aspect of the present invention, in the crawler traveling device according to the first aspect, tooth portion support faces that support the tooth portions are formed at the engaging recess portions.

In the crawler traveling device according to the second aspect of the present invention, the wheel portion of the driving wheel is supported by the wheel portion support faces of the elastic crawler, and the tooth portions of the driving wheel are supported by the tooth portion support faces of the engaging recess portions of the elastic crawler. Therefore, loads from the driving wheel are spread between the wheel portion support faces and the tooth portion support faces (in other words, contact pressures at the support faces are reduced). As a result, the progress of wearing of the wheel portion support faces may be suppressed in this crawler traveling device compared to, for example, a crawler traveling device in which loads are borne by wheel portion support faces alone.

In a crawler traveling device according to a third aspect of the present invention, in the crawler traveling device according to the second aspect, the tooth portion support faces are formed at width direction side walls structuring the engaging recess portions, and supported faces to be supported at the tooth portion support faces formed at the side walls are formed at the tooth portions.

In the crawler traveling device according to the third aspect of the present invention, the tooth portion support faces are formed at the width direction side walls of the engaging recess portions, and the supported faces to be supported at the tooth portion support faces are formed at the tooth portions. Therefore, the distribution of a load from the driving wheel that is borne by a tooth portion support face may be made more uniform than in, for example, a case in which the supported surface is not formed at the tooth portion.

An elastic crawler according to a fourth aspect of the present invention includes: an elastic body in an endless shape that is wrapped round a driving wheel; cores that are embedded in the elastic body, spaced apart in an elastic body peripheral direction, and that extend in an elastic body width direction, a pair of protrusions that protrude to an elastic body inner side being formed at each core at both elastic body width direction sides sandwiching a elastic body width direction central portion of the core; wheel portion support faces that are formed between the central portions of the cores that are mutually adjacent in the elastic body peripheral direction of the elastic body, the wheel portion support faces being disposed at the elastic body inner side relative to the central portions and supporting the driving wheel; and engaging recess portions that are formed at both elastic body width direction sides, sandwiching the wheel portion support faces of the elastic body, between the protrusions of the cores that are mutually adjacent in the elastic body peripheral direction, the engaging recess portions being recessed toward the elastic body outer side, and tooth portions that are provided at an outer periphery of the driving wheel and project to the radial direction outer side being inserted into and engaged with the engaging recess portions.

In the elastic crawler according to the fourth aspect of the present invention, when the driving wheel turns in the state in which the tooth portions of the driving wheel are inserted into and engaged with the engaging recess portions of the elastic body, driving force is transmitted.

In this elastic crawler, because of the structure in which the tooth portions of the driving wheel are inserted into and engaged with the engaging recess portions, the state of engagement between the tooth portions of the driving wheel and the engaging recess portions of the elastic body may be maintained even though drive protrusions are not increased in height as in, for example, an elastic crawler of the type in which circular rod-shaped drive pins (tooth portions) push against angled faces of protrusions of taper-shaped cores. That is, compared to the above-mentioned type of elastic crawler in which drive pins push against drive protrusions, the elastic crawler of the fourth aspect may suppress jumping at the driving wheel while suppressing an increase in weight.

Due thereto, according to the elastic crawler in accordance with the fourth aspect of the present invention, both jumping at the driving wheel may be suppressed and an increase in weight may be suppressed.

Advantageous Effects of Invention

As described hereabove, the crawler traveling device and elastic crawler of the present invention may both suppress jumping at a driving wheel and suppress an increase in weight.

BRIEF DESCRIPTION OF DRAWINGS

FIG. 1 is a perspective view, including a partial section, of a crawler traveling device in accordance with a first exemplary embodiment of the present invention.

FIG. 3 is a plan view showing an inner periphery face of an elastic crawler of the crawler traveling device in accordance with the first exemplary embodiment.

FIG. 5 is a sectional view taken along a crawler peripheral direction of the elastic crawler, showing the state in which the tooth portions of the driving wheel of the crawler traveling device in accordance with the first exemplary embodiment are inserted into and engaged with the engaging recess portions of the elastic crawler.

FIG. 7 is a sectional view taken along the crawler width direction of an elastic crawler, showing a state in which a tooth portion of the driving wheel of the crawler traveling device in accordance with the second exemplary embodiment is inserted into and engaged with an engaging recess portion of the elastic crawler.

FIG. 10 is a sectional view taken along the crawler width direction of an elastic crawler, showing a state in which a tooth portion of the driving wheel of the crawler traveling device in accordance with the third exemplary embodiment is inserted into and engaged with an engaging recess portion of the elastic crawler.

FIG. 11 is a sectional view taken along the crawler peripheral direction of the elastic crawler, showing the state in which the tooth portions of the driving wheel of the crawler traveling device in accordance with the third exemplary embodiment are inserted into and engaged with the engaging recess portions of the elastic crawler.

FIG. 15A is a side view showing a portion of a side face of a driving wheel of a crawler traveling device in accordance with an alternative exemplary embodiment of the present invention.

FIG. 15B is a sectional view taken along line X5-X5 of FIG. 15A.

DESCRIPTION OF EMBODIMENTS

First Exemplary Embodiment

Figure 2A:
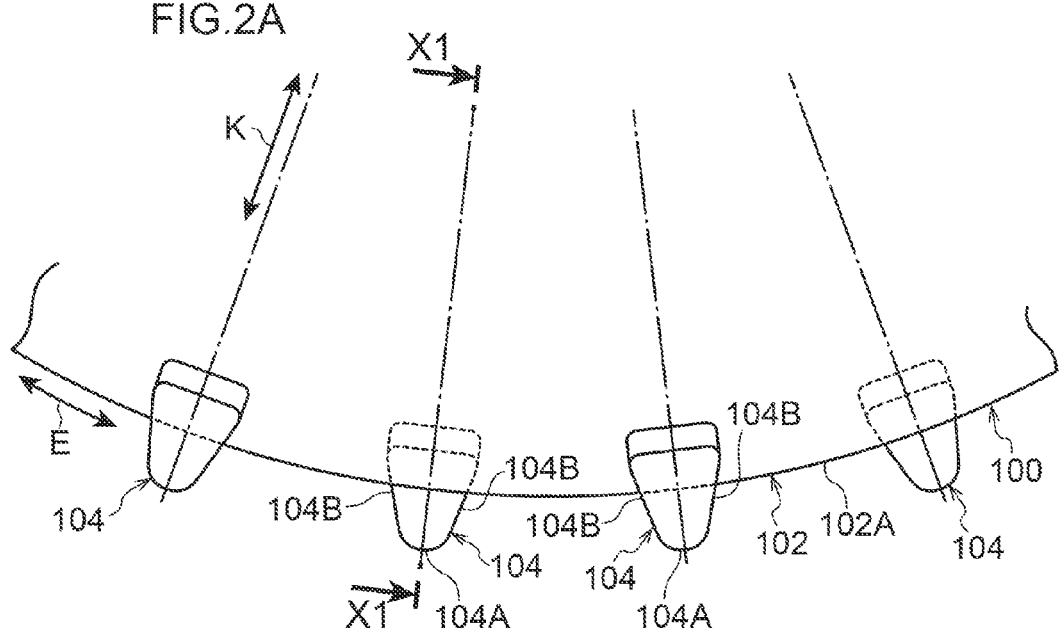
FIG. 2A is a side view showing a portion of a side face of a driving wheel of the crawler traveling device in accordance with the first exemplary embodiment.

Herebelow, a crawler traveling device and an elastic crawler according to a first exemplary embodiment of the present invention are described using FIG. 1 to FIG. 5.

As shown in FIG. 1, a crawler traveling device 12 according to the first exemplary embodiment includes a sprocket 100, an idler (not shown in the drawings) and a plural number of track rollers (not shown in the drawings). The sprocket 100 is an example of a driving wheel that is mounted at a driving axle of a crawler vehicle (for example, a tractor or the like). The idler is an example of an idling wheel mounted at the crawler vehicle. The track rollers are mounted at the crawler vehicle so as to be disposed between the sprocket 100 and the idler. The crawler traveling device 12 also includes a rubber crawler 14, which is an example of an elastic crawler in an endless shape, wrapped round the sprocket 100, the idler (not shown in the drawings) and the track rollers (not shown in the drawings).

—Sprocket—

Next, the sprocket 100 of the present exemplary embodiment is described.

Figure 2B:
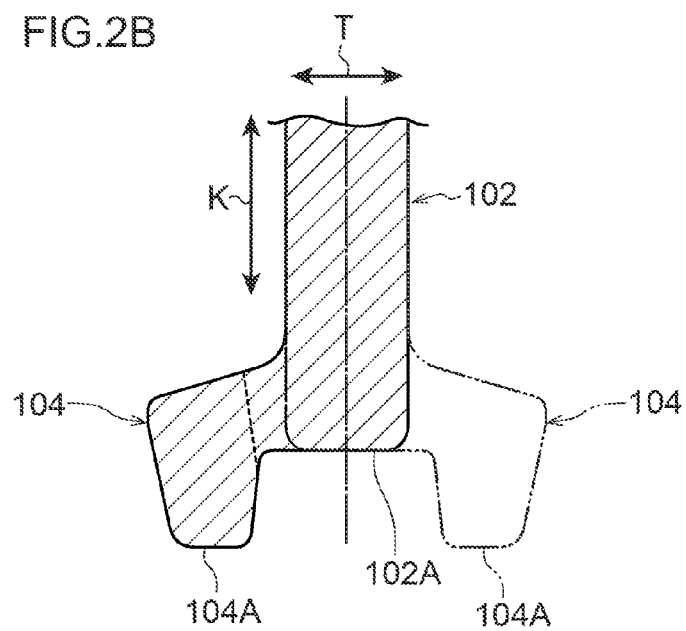
FIG. 2B is a sectional view taken along line X1-X1 of FIG. 2A.

In the present exemplary embodiment, as illustrated in FIG. 1, FIG. 2A and FIG. 2B, a circumferential direction of the sprocket 100 (arrow E in the drawings) is referred to as "the sprocket circumferential direction", a radial direction of the sprocket 100 (arrow K in the drawings) is referred to as "the sprocket radial direction", and a width direction of the sprocket 100 (arrow T in the drawings) is referred to as "the sprocket width direction".

As shown in FIG. 1 and FIG. 2A, the sprocket 100 is provided with a circular disc-shaped wheel portion 102 that is mounted at the driving axle. A circumferential direction, radial direction and width direction of the wheel portion 102 according to the present exemplary embodiment coincide with the sprocket circumferential direction, sprocket radial direction and sprocket width direction, respectively.

The sprocket 100 is provided with tooth portions 104 that are formed, spaced apart in the sprocket circumferential direction (with a constant spacing in the present exemplary embodiment), at outer periphery edge portion sides of side portions of the wheel portion 102. The tooth portions 104 protrude to the sprocket radial direction outer side relative to an outer periphery face 102A of the wheel portion 102.

As shown in FIG. 2A, each tooth portion 104 is a block body with a substantially triangular shape in a sprocket side view (viewed in the sprocket width direction) that tapers from a protrusion proximal side to a protrusion distal end side. A distal end portion of the tooth portion 104 curves so as to form a projection to the sprocket radial direction outer side.

The tooth portion 104 is inserted into and engaged with an engaging recess portion 32 of the rubber crawler 14, which is described below (see FIG. 5). Specifically, as shown in FIG. 5, a sprocket circumferential direction angled face of the tooth portion 104 with a flat shape engages with (abuts against) a crawler peripheral direction wall face of the engaging recess portion 32, and driving force from the sprocket 100 is transmitted to the rubber crawler 14 via the engaging recess portion 32.

Herebelow, the sprocket circumferential direction angled face of the tooth portion 104 is referred to as a pushing face 104B.

As shown in FIG. 1, the tooth portions 104 are formed to alternate between the two side portions of the wheel portion 102 in the sprocket circumferential direction. Specifically, in the sprocket side view, each tooth portion 104 at one side portion of the wheel portion 102 is disposed midway between mutually adjacent tooth portions 104 at the other side portion.

The sprocket 100 according to the present exemplary embodiment is a casting in which the wheel portion 102 and the tooth portions 104 are integrally formed.

—Rubber Crawler—

Now, the rubber crawler 14 according to the present exemplary embodiment is described.

In the present exemplary embodiment, as shown in FIG. 1, a peripheral direction of the rubber crawler 14 (arrow S in the drawings) is referred to as "the crawler peripheral direction" and a width direction of the rubber crawler 14 (arrow W in the drawings) is referred to as "the crawler width direction". The crawler peripheral direction and the crawler width direction are orthogonal if the rubber crawler 14 is viewed from an outer periphery side or an inner periphery side (see FIG. 3). The peripheral direction of the rubber crawler 14 can also be referred to as a length direction of the rubber crawler 14.

Furthermore, in the present exemplary embodiment, the inner side of the rubber crawler 14 in the state in which the rubber crawler 14 is wrapped round (arrow IN in the drawings) is referred to as "the crawler inner side" and the outer side of the rubber crawler 14 (arrow OUT in the drawings) is referred to as "the crawler outer side". The crawler outer side can alternatively be referred to as a ground contact face side of the rubber crawler 14 and the crawler inner side can alternatively be referred to as a side opposite to the ground contact side (a non-contact side) of the rubber crawler 14. The in-and-out direction of the rubber crawler 14 is referred to as the crawler in-and-out direction. The crawler in-and-out direction can alternatively be referred to as a thickness direction of the rubber crawler 14.

Figure 4:
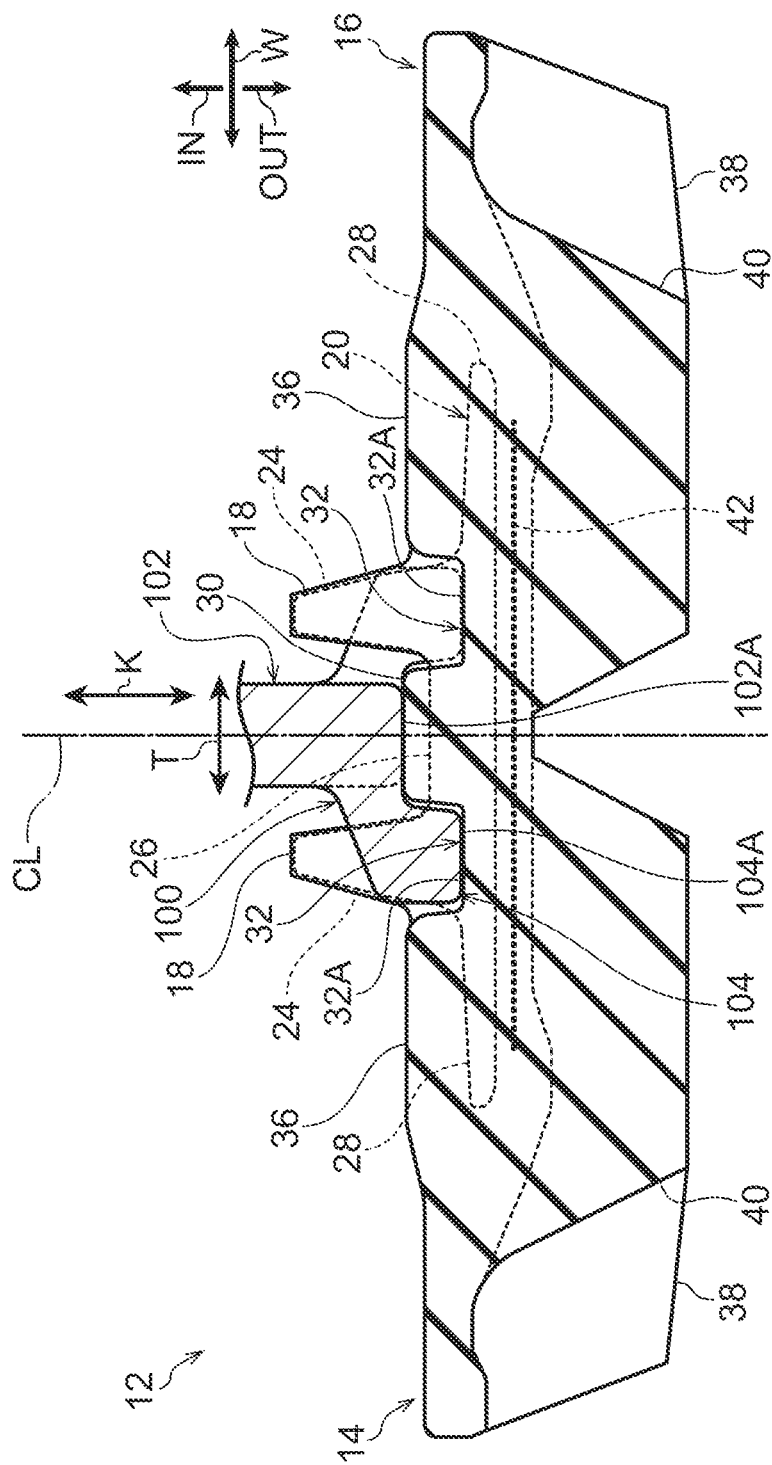
FIG. 4 is a sectional view taken along a crawler width direction of the elastic crawler, showing a state in which a tooth portion of the driving wheel of the crawler traveling device in accordance with the first exemplary embodiment is inserted into and engaged with an engaging recess portion of the elastic crawler.

In the state in which the rubber crawler 14 is wrapped round the sprocket 100, the sprocket width direction and the crawler width direction substantially coincide (see FIG. 4).

As shown in FIG. 1, the rubber crawler 14 includes a rubber body 16 that is formed in an endless belt shape of a rubber material. The rubber body 16 according to the present exemplary embodiment is an example of an elastic body of the present invention.

A width direction, peripheral direction, inner side and outer side of the rubber body 16 of the present exemplary embodiment coincide with the crawler width direction, the crawler peripheral direction, the crawler inner side and the crawler outer side, respectively.

As shown in FIG. 1 and FIG. 3, cores 20 that extend in the crawler width direction are plurally embedded in the rubber body 16. The cores 20 are spaced apart in the crawler peripheral direction (at a constant spacing in the present exemplary embodiment). As shown in FIG. 3 and FIG. 4, a line passing through crawler width direction centers of the cores 20 coincides with a line passing along the crawler width direction center of the rubber body 16. The reference symbol CL in the drawings indicates a center line of the rubber crawler 14, which coincides with the line passing along the center of the rubber body 16.

As shown in FIG. 3 and FIG. 4, each core 20 is structured by a crawler width direction central portion 26, a pair of flank portions 28 that extend in the crawler width direction from each of the two corner width direction end sides of the central portion 26, and a pair of protrusions 24 (see FIG. 4) that protrude to the crawler inner side. The protrusions 24 protrude to the crawler inner side from proximal regions of the flank portions 28. A protrusion distal end side of each protrusion 24 protrudes from an inner periphery portion of the rubber body 16. As shown in FIG. 5, each protrusion 24 has a substantially triangular shape in a crawler side view (viewed in the crawler width direction) that tapers toward the protrusion distal end side thereof, and an apex portion of the protrusion 24 has a flat shape.

As shown in FIG. 4, the pair of protrusions 24 are formed to be separated by a space through which the wheel portion 102 of the sprocket 100 passes, and the protrusions 24 abut against the sprocket 100 passing therebetween. Thus, movement of the sprocket 100 in the crawler width direction may be restricted. That is, a movement direction of the sprocket 100 may be guided (the same direction as the crawler peripheral direction in the present exemplary embodiment).

As shown in FIG. 3, wheel portion support faces 30 are formed at the rubber body 16. Each wheel portion support face 30 is formed between the central portions 26 of cores 20 that are adjacent to one another in the crawler peripheral direction. The wheel portion support faces 30 support the outer periphery face 102A of the wheel portion 102 of the sprocket 100. Each wheel portion support face 30 is disposed at the crawler inner side (the side indicated by arrow IN) relative to the central portions 26 (see FIG. 4). Thus, when the sprocket 100 passes between each pair of protrusions 24, contact between the outer periphery face 102A of the wheel portion 102 and the central portion 26 of the core 20 is inhibited.

In the present exemplary embodiment, the circular disc-shaped idler (not shown in the drawings) also moves over the wheel portion support faces 30.

As shown in FIG. 3 and FIG. 4, the engaging recess portions 32 are formed at an inner periphery portion of the rubber body 16 as pairs sandwiching the wheel portion support faces 30 from the two crawler width direction outer sides of the wheel portion support faces 30. Each engaging recess portion 32 is formed between protrusions 24 that are adjacent to one another in the crawler peripheral direction. The tooth portions 104 of the sprocket 100 can be inserted into and engaged with the engaging recess portions 32.

As shown in FIG. 4 and FIG. 5, each engaging recess portion 32 is recessed toward the crawler outer side. The depth of the engaging recess portion 32 is specified to be a depth at which a distal end portion 104A of the tooth portion 104 abuts against a floor face 32A of the engaging recess portion 32 when the wheel portion 102 is moving over the wheel portion support face 30. That is, the floor face 32A provided at the engaging recess portion 32 may make contact with the distal end portion 104A of the tooth portion 104 and support the tooth portion 104. This floor face 32A is an example of a tooth portion support face of the present invention.

In alternative embodiments of the present invention, the depth of the engaging recess portion 32 may be specified to be a depth at which the distal end portion 104A of the tooth portion 104 does not make contact with (does not reach) the floor face 32A of the engaging recess portion 32 when the wheel portion 102 is moving over the wheel portion support face 30, and may be specified to be a depth at which the distal end portion 104A of the tooth portion 104 makes contact with the floor face 32A only if wear of the wheel portion support face 30 is advanced.

As shown in FIG. 5, the pushing face 104B of each tooth portion 104 engages with (abuts against) a crawler peripheral direction wall face of the engaging recess portion 32.

As shown in FIG. 3 to FIG. 5, due to the circumstances of manufacture of the rubber crawler 14 according to the present exemplary embodiment, surfaces of the protrusions 24 are covered with a thin rubber film when the rubber crawler 14 is new. This rubber film is stripped away and removed from the protrusions 24 (in other words, is stripped off) as the wheel portion 102 and tooth portions 104 of the sprocket 100 and the like abut repeatedly. Therefore, when the rubber crawler is new, the crawler peripheral direction wall face of each engaging recess portion 32 is structured with a rubber film that covers a protrusion proximal side of an angled face (a crawler peripheral direction angled face) of the protrusion 24. After the rubber crawler has been used to some extent and the rubber film covering the protrusion proximal side of the angled face of each protrusion 24 has been stripped off, the wall face is structured by the protrusion proximal side of the angled face of the protrusion 24. Note that the present invention is not limited to the structure described above; the rubber layer may be stripped from the surfaces of the protrusions 24 before the rubber crawler 14 is shipped.

As shown in FIG. 1, FIG. 3 and FIG. 4, flat track roller passing surfaces 36 are formed at the rubber body 16. The track roller passing surfaces 36 are formed continuously in the crawler peripheral direction. Track rollers (not shown in the drawings) at the two crawler width direction outer sides, sandwiching the pairs of engaging recess portions 32, roll on the track roller passing surfaces 36.

As shown in FIG. 1, long lugs 38 in block shapes are formed in pairs at an outer periphery portion of the rubber body 16. The long lugs 38 protrude to the crawler outer side and extend in the crawler width direction, and sandwich the center line CL.

Short lugs 40 in block shapes are also formed in pairs at the outer periphery portion of the rubber body 16. The short lugs 40 protrude to the crawler outer side and extend in the crawler width direction, and sandwich the center line CL.

The pairs of long lugs 38 and pairs of short lugs 40 are formed alternatingly, spaced apart by a certain spacing, in the crawler peripheral direction.

The long lugs 38 and the short lugs 40 are portions of the rubber crawler 14 that make contact with the ground.

As shown in FIG. 4, a reinforcement layer 42 in an endless belt shape is embedded in the rubber body 16. The reinforcement layer 42 extends along the crawler peripheral direction at the crawler outer side of the cores 20. The reinforcement layer 42 is formed by a single reinforcement cord that is wound into a helical shape along the crawler peripheral directional or a plural number of reinforcement cords that are arranged side by side along the crawler peripheral direction being covered with rubber. In the present exemplary embodiment, steel cords that are excellent in regard to tensile strength are used as the reinforcement cord(s), but the present invention is not limited to this constitution. Provided the tensile strength is sufficient, cords that are constituted by, for example, organic fibers or the like may be used as the reinforcement cords.

Next, operation and effects of the crawler traveling device 12 of the present exemplary embodiment are described.

The rubber crawler 14 of the crawler traveling device 12 is wrapped round the sprocket 100 and the idler (not shown in the drawings) with a predetermined tension. Hence, during light-load travel, frictional forces are produced between the outer periphery face 102A of the wheel portion 102 of the sprocket 100 and the wheel portion support faces 30 of the rubber crawler 14 by rotation of the sprocket 100. Driving force from the sprocket 100 is transmitted to the rubber crawler 14 by these frictional forces, the rubber crawler 14 cycles between the sprocket 100 and the idler (not shown in the drawings), and the rubber crawler 14 travels.

On the other hand, during heavy-load travel, each tooth portion 104 of the sprocket 100 of the crawler traveling device 12 is inserted into and engaged with one of the pairs of engaging recess portions 32 of the rubber crawler 14 (specifically, the tooth portion 104 is inserted into the engaging recess portion 32 and the pushing face 104E abuts against the crawler peripheral direction wall face of the engaging recess portion 32). Hence, the crawler peripheral direction wall face of the engaging recess portion 32 is pushed by the tooth portion 104 due to the rotation of the sprocket 100, and driving force is transmitted to the rubber crawler 14. Thus, the rubber crawler 14 cycles between the sprocket 100, the idler (not shown in the drawings) and the track rollers (not shown in the drawings), and the crawler vehicle equipped with the crawler traveling device 12 moves over the ground.

In this crawler traveling device 12 during heavy-load travel, because the tooth portions 104 of the sprocket 100 are inserted into and engaged in (inserted into and engaged with) the engaging recess portions 32 of the rubber crawler 14, the state of engagement between each tooth portion 104 and the engaging recess portion 32 may be maintained even though drive protrusions (the protrusions 24) are not increased in height as in a crawler traveling device of the type in which circular rod-shaped drive pins are provided at the side portions of the wheel portion 102 and push against angled faces of taper-shaped drive protrusions of the rubber crawler. That is, compared to a crawler traveling device of the above-mentioned type in which the drive pins push against the drive protrusions, in the crawler traveling device 12 the height of the protrusions 24 can be restrained, and both jumping at the sprocket 100 may be suppressed and an increase in weight of the rubber crawler 14 may be suppressed.

In particular, in the rubber crawler 14 of the present exemplary embodiment, the protrusions 24 are disposed between the engaging recess portions 32 that are mutually adjacent in the crawler peripheral direction. Therefore, even if a tooth portion 104 disengages from the engaging recess portion 32, the tooth portion 104 abuts against the protrusion distal end side of the protrusion 24. Therefore, jumping at the sprocket 100 may be effectively suppressed.

In the crawler traveling device 12, the outer periphery face 102A of the wheel portion 102 is supported by the wheel portion support faces 30 of the rubber crawler 14, and the distal end portions 104A of the tooth portions 104 are supported by the floor faces 32A of the engaging recess portions 32. Therefore, loads from the sprocket 100 may be spread over the wheel portion support faces 30 and the floor faces 32A (in other words, the ground contact pressure of each support surface is lowered). Thus, the progress of wearing of the wheel portion support faces 30 may be suppressed in the crawler traveling device 12 compared to a structure in which, for example, only the wheel portion support faces 30 bear loads from the sprocket 100, and states of meshing between the tooth portions 104 and the engaging recess portions 32 may be maintained. As a result, reductions in driving force transmission efficiency over long periods may be suppressed.

Meanwhile in the crawler traveling device 12, the idler (not shown in the drawings) also rolls over the wheel portion support faces 30. Consequently, the progress of wearing of the wheel portion support faces 30 is faster than in a structure in which an idler does not roll over the wheel portion support faces 30. However, in the crawler traveling device 12 the tooth portions 104 are supported at the floor faces 32A of the engaging recess portions 32, which are portions on which the circular disc-shaped idler does not roll. Therefore, even if wearing of the wheel portion support faces 30 due to rolling of the sprocket 100 and the idler progresses, the states of meshing between the tooth portions 104 and the engaging recess portions 32 may be maintained. As a result, reductions in driving force transmission efficiency over long periods may be suppressed.

In the crawler traveling device 12, as described above, the outer periphery face 102A of the wheel portion 102 is supported by the wheel portion support faces 30 of the rubber crawler 14 and the distal end portions 104A of the tooth portions 104 are supported by the floor faces 32A of the engaging recess portions 32. Therefore, an area of contact between the sprocket 100 and the rubber crawler 14 is increased. Consequently, lateral slipping of the rubber crawler 14 and the sprocket 100 (relative displacement in the crawler width direction) during travel may be suppressed.

Due thereto, according to the crawler traveling device 12, both an increase in weight may be suppressed and jumping at the sprocket 100 may be suppressed, in addition to which the progress of wear of portions on which the wheel portion 102 of the sprocket 100 rolls (the wheel portion support faces 30) may be inhibited.

In the present exemplary embodiment, as shown in FIG. 2A, each tooth portion 104 at the other side portion of the wheel portion 102 is disposed midway between mutually adjacent tooth portions 104 at the one side portion. Therefore, the number of tooth portions 104 may be made smaller than in a structure in which, for example, the tooth portions 104 are disposed at the same positions at both side portions of the wheel portion 102. Thus, the weight of the sprocket 100 may be reduced; that is, the weight of the crawler traveling device 12 may be reduced.

In the first exemplary embodiment described above, each tooth portion 104 at the other side portion of the wheel portion 102 is disposed midway between mutually adjacent tooth portions 104 at the one side portion, but the present invention is not limited to this structure. The tooth portions 104 may be disposed at the same positions at both side portions of the wheel portion 102. In this case, a reaction force to the driving force received by each tooth portion 104 in the state in which the tooth portion 104 is engaged with an engaging recess portion 32 is reduced. As a result, failures of the tooth portions 104 can be suppressed.

Second Exemplary Embodiment

Now, a crawler traveling device in accordance with a second exemplary embodiment of the present invention is described while referring to FIG. 6A to FIG. 8. Structures that are the same as in the first exemplary embodiment are assigned the same reference numerals and are not described here.

Figure 8:
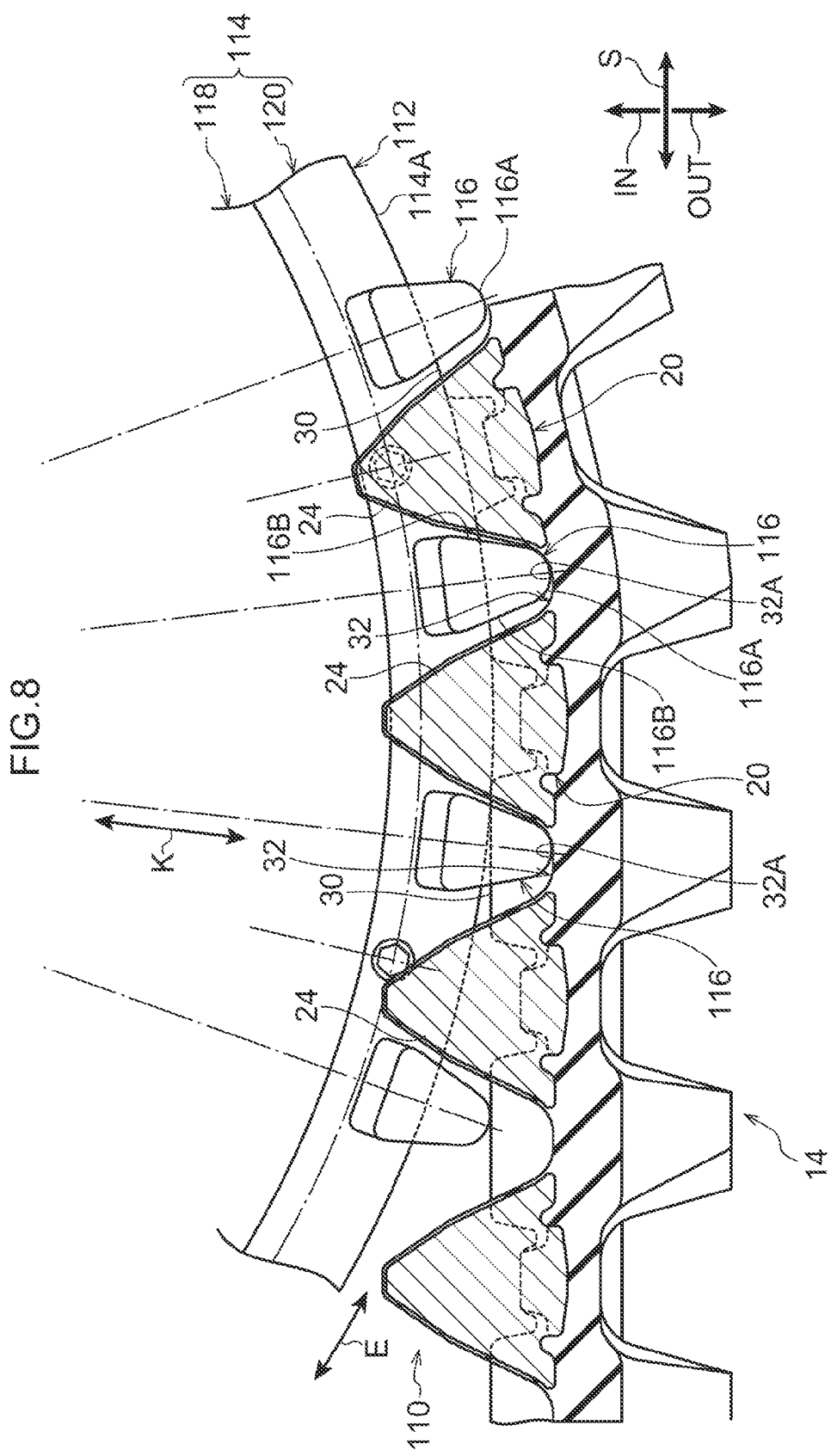
FIG. 8 is a sectional view taken along the crawler peripheral direction of the elastic crawler, showing the state in which the tooth portions of the driving wheel of the crawler traveling device in accordance with the second exemplary embodiment are inserted into and engaged with the engaging recess portions of the elastic crawler.

As shown in FIG. 7 and FIG. 8, a crawler traveling device 110 according to the second exemplary embodiment includes a sprocket 112, an idler (not shown in the drawings), a plural number of track rollers (not shown in the drawings) and the rubber crawler 14. The sprocket 112 is an example of the driving wheel that is mounted at a driving axle of a crawler vehicle (for example, a tractor or the like). The idler has the same structure as in the first exemplary embodiment. The track rollers have the same structure as in the first exemplary embodiment. The rubber crawler 14 also has the same structure as in the first exemplary embodiment. The same as in the first exemplary embodiment, the rubber crawler 14 is wrapped round the sprocket 112, the idler (not shown in the drawings) and the track rollers (not shown in the drawings).

—Sprocket—

Now, the sprocket 112 of the present exemplary embodiment is described. In the present exemplary embodiment, the same as in the first exemplary embodiment, a circumferential direction, radial direction, and width direction of the sprocket 112 are referred to as "the sprocket circumferential direction", "the sprocket radial direction" and "the sprocket width direction", respectively.

Figure 6A:
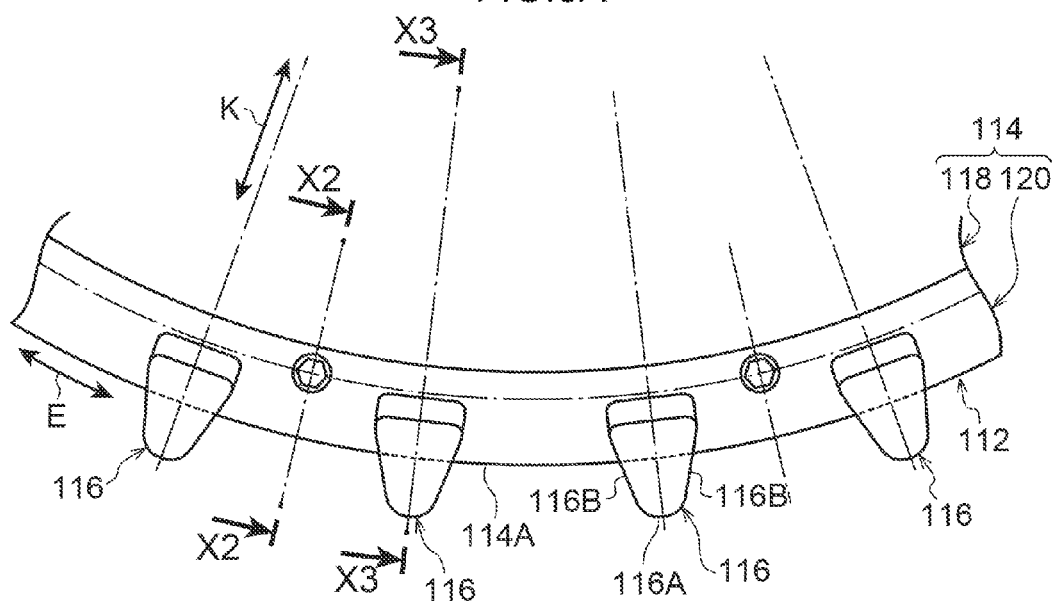
FIG. 6A is a side view showing a portion of a side face of a driving wheel of a crawler traveling device in accordance with a second exemplary embodiment of the present invention.

As shown in FIG. 6A, the sprocket 112 is provided with a circular disc-shaped wheel portion 114 that is mounted at the aforementioned driving axle. A circumferential direction, radial direction and width direction of the wheel portion 114 according to the present exemplary embodiment coincide with the sprocket circumferential direction, sprocket radial direction and sprocket width direction, respectively.

The sprocket 112 is equipped with tooth portions 116 that are formed to be spaced apart (with a constant spacing in the present exemplary embodiment) in the sprocket circumferential direction at outer periphery edge portion sides of side portions of the wheel portion 114. The tooth portions 116 protrude to the sprocket radial direction outer side relative to an outer periphery face 114A of the wheel portion 114. The tooth portions 116 are formed in pairs at matching positions of the two side portions of the wheel portion 114. The outer periphery face 114A of the wheel portion 114 of the present exemplary embodiment is structured by outer periphery faces of pairs of annular members 120, which are described below (see FIG. 6B and FIG. 6C).

As shown in FIG. 6A, each tooth portion 116 is a block body with a substantially triangular shape in the sprocket side view (viewed in the sprocket width direction) that tapers from a protrusion proximal side to a protrusion distal end side. A distal end portion 116A of the tooth portion 116 curves so as to form a projection to the sprocket radial direction outer side.

Each tooth portion 116 is inserted into and engaged with one of the engaging recess portions 32 of the rubber crawler 14 (see FIG. 8). Specifically, as shown in FIG. 8, a sprocket circumferential direction angled face of the tooth portion 116 with a flat shape (a pushing face 116B) engages with (abuts against) the crawler peripheral direction wall face of the engaging recess portion 32, and driving force from the sprocket 112 is transmitted to the rubber crawler 14 via the engaging recess portion 32.

Figure 6B:
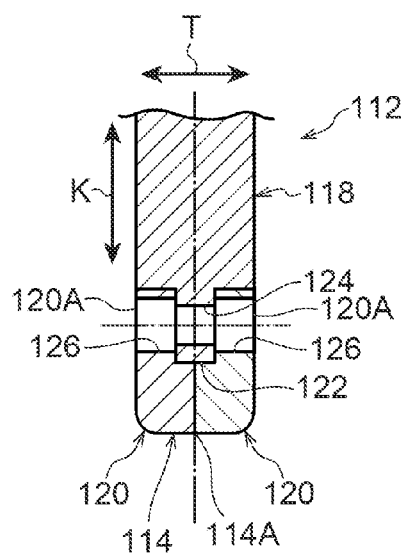
FIG. 6B is a sectional view taken along line X2-X2 of FIG. 6A.
Figure 6C:
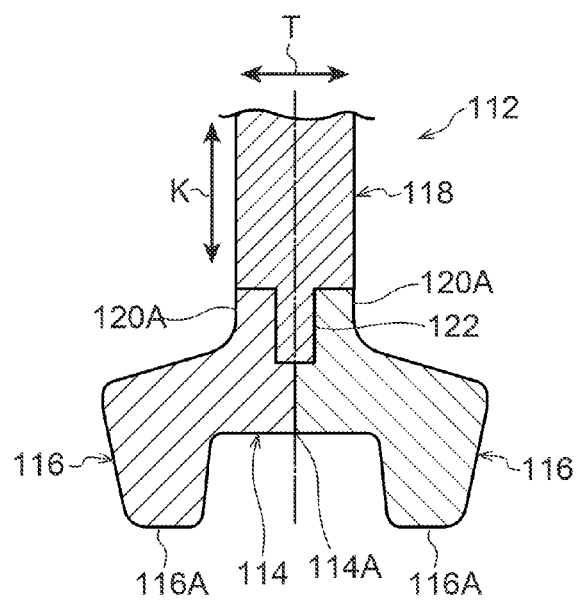
FIG. 6C is a sectional view taken along line X3-X3 of FIG. 6A.

As shown in FIG. 6A and FIG. 6C, the wheel portion 114 is structured by a disc body 118 and the annular members 120, which are a pair in the sprocket width direction. The disc body 118 structures a radial direction inner side portion of the wheel portion 114. The annular members 120 are attached to the disc body 118 and structure a sprocket radial direction outer side portion of the wheel portion 114.

As shown in FIG. 6B and FIG. 6C, a rib 122 is formed at a sprocket width direction central portion of an outer periphery face of the disc body 118. The rib 122 protrudes to the sprocket radial direction outer side and is continuous in the sprocket circumferential direction. Plural penetrating holes 124 are formed in the rib 122. The penetrating holes 124 are spaced apart in the sprocket circumferential direction (with a constant spacing in the present exemplary embodiment) and penetrate through the rib 122 in the sprocket width direction.

Each annular member 120 has a continuous annular shape, and is disposed such that an inner side portion 120A at the sprocket radial direction inner side of the annular member 120 overlaps in the sprocket width direction with the rib 122. That is, the pair of annular members 120 are disposed so as to sandwich the rib 122 with the inner side portions 120A from both sides (see FIG. 6C).

As shown in FIG. 6B, penetrating holes 126 are formed in each inner side portion 120A, at positions corresponding with the penetrating holes 124 of the rib 122. The penetrating holes 126 have a slightly larger radius than the penetrating holes 124. In the state in which the pair of annular members 120 are sandwiching the rib 122, the annular members 120 are attached to the rib 122 (the disc body 118) by bolts that are inserted through the respective penetrating holes and nuts that are threaded onto the bolts. Note that the nuts and bolts are an example of a fastener.

As shown in FIG. 6A and FIG. 6C, the tooth portions 116 of the present exemplary embodiment are formed at the sprocket radial direction outer side of each annular member 120 relative to the inner side portion 120A. These tooth portions 116 are formed integrally with the annular members 120.

The disc body 118 and annular members 120 of the present exemplary embodiment are formed by forging.

Next, operations and effects of the crawler traveling device 110 of the second exemplary embodiment are described.

Operations and effects of the present exemplary embodiment that are the same as operations and effects of the first exemplary embodiment are not described here.

In the crawler traveling device 110, because the tooth portions 116 of the sprocket 112 are formed in pairs at matching positions of the two side portions of the wheel portion 114, a reaction force to a driving force received by an individual tooth portion 116 in the state in which the tooth portions 116 and the engaging recess portions 32 are engaged is reduced. As a result, failures of the tooth portions 116 (for example, deformations and the like) can be suppressed. Thus, endurance of the sprocket 112 is improved.

Moreover, the driving force received from an individual tooth portion 116 by the crawler peripheral direction wall face of the engaging recess portion 32 of the rubber crawler 14 is also reduced. Therefore, wear of, for example, the crawler peripheral direction wall face of each protrusion 24 and the like can be suppressed. Thus, endurance of the rubber crawler 14 is improved.

Hence, endurance of the crawler traveling device 110 is improved.

If, however, there is a failure among the tooth portions 116 of the annular members 120, the lifetime of the sprocket 112 may be extended by detaching the annular member 120 at which the failing tooth portion 116 is formed from the wheel portion 114 and replacing this annular member 120 with a new annular member 120.

In the present exemplary embodiment, the sprocket 112 is divided into the circular disc-shaped disc body 118 and the pair of annular members 120. Therefore, formation by forging in which a metal material is machined while being compressed and extruded is easier than with, for example, a structure that is not divided. Because the sprocket 112 is formed by forging in this manner, the toughness and wear resistance thereof are excellent compared to, for example, a casting, and consequently endurance is improved.

In the second exemplary embodiment, the disc body 118 and the annular members 120 are formed by forging, but the present invention is not limited to this structure. The disc body 118 and annular members 120 may be fabricated by casting. Because the sprocket 112 is divided into the circular disc-shaped disc body 118 and the pair of annular members 120 in the second exemplary embodiment, formation by casting is simpler than with, for example, a structure that is not divided.

In the second exemplary embodiment, the disc body 118 and the annular members 120 are constituted of the same metal material. However, the present invention is not limited thus; the disc body 118 and the annular members 120 may be constituted of different metal materials. Accordingly, the disc body 118 and the annular members 120 may be respectively formed of different metallic materials in accordance with the capabilities that are required thereof. Thus, the sprocket 112 may be improved in endurance and reduced in weight.

In the second exemplary embodiment, each annular member 120 has a continuous annular shape. However, the present invention is not limited to this structure. A structure is possible in which the annular member 120 is plurally divided in the sprocket circumferential direction, structuring a plural number of divided bodies, and these divided bodies are attached to the disc body 118. With this structure, a replacement operation may be completed by removing only a divided body at which a failing tooth portion 116 is formed from the wheel portion 114 and replacing just that divided body with a new divided body. Because the divided body is lighter in weight than the annular member 120 with a continuous annular shape, the replacement operation is easier to perform. Moreover, because the number of nuts and bolts to be fastened is smaller, the replacement operation is easier and quicker.

In the sprocket 112 of the second exemplary embodiment, a structure in which each tooth portion 116 at the other side portion of the wheel portion 114 is disposed midway between mutually adjacent tooth portions 116 at the one side portion, the same as in the sprocket 100 of the first exemplary embodiment, may be employed.

Third Exemplary Embodiment

Now, a crawler traveling device in accordance with a third exemplary embodiment of the present invention is described while referring to FIG. 9A to FIG. 11. Structures that are the same as in the first exemplary embodiment are assigned the same reference numerals and are not described here.

As shown in FIG. 10 and FIG. 11, a crawler traveling device 130 according to the third exemplary embodiment includes a sprocket 132, an idler (not shown in the drawings), a plural number of track rollers (not shown in the drawings) and a rubber crawler 140 in an endless shape. The sprocket 132 is an example of the driving wheel that is mounted at the driving axle of a crawler vehicle (for example, a tractor or the like). The idler has the same structure as in the first exemplary embodiment. The track rollers have the same structure as in the first exemplary embodiment. The rubber crawler 140, the same as in the first exemplary embodiment, is wrapped round the sprocket 132, the idler (not shown in the drawings) and the track rollers (not shown in the drawings).

—Sprocket—

Now, the sprocket 132 of the present exemplary embodiment is described. In the present exemplary embodiment, the same as in the first exemplary embodiment, a circumferential direction, radial direction, and width direction of the sprocket 132 are referred to as "the sprocket circumferential direction", "the sprocket radial direction" and "the sprocket width direction", respectively.

Figure 9A:
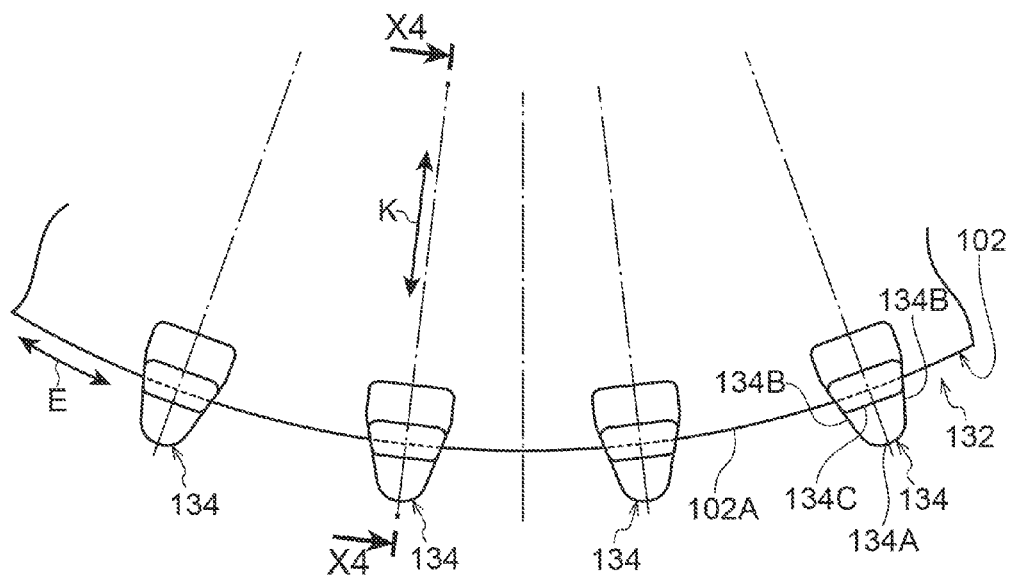
FIG. 9A is a side view showing a portion of a side face of a driving wheel of a crawler traveling device in accordance with a third exemplary embodiment of the present invention.
Figure 9B:
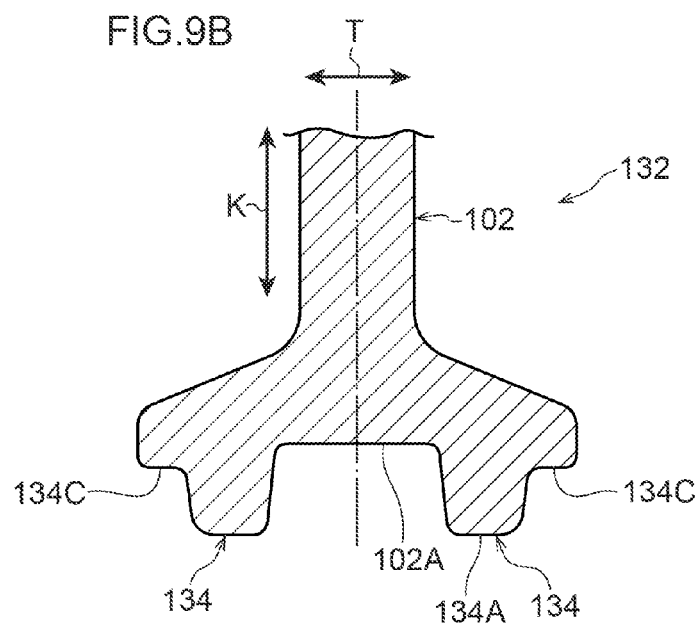
FIG. 9B is a sectional view taken along line X4-X4 of FIG. 9A.

As shown in FIG. 9A and FIG. 9B, the sprocket 132 is equipped with the wheel portion 102, with the same structure as in the first exemplary embodiment. The circumferential direction, radial direction and width direction of the wheel portion 102 according to the present exemplary embodiment coincide with the sprocket circumferential direction, sprocket radial direction and sprocket width direction of the present exemplary embodiment, respectively.

The sprocket 132 is provided with tooth portions 134 that are formed to be spaced apart (with a constant spacing in the present exemplary embodiment) in the sprocket circumferential direction at the outer periphery edge portion sides of the side portions of the wheel portion 102. The tooth portions 134 protrude to the sprocket radial direction outer side relative to the outer periphery face 102A of the wheel portion 102. The tooth portions 134 are formed in pairs at matching positions of the two side portions of the wheel portion 102.

As shown in FIG. 9A, each tooth portion 134 is a block body with a substantially triangular shape in the sprocket side view (viewed in the sprocket width direction) that tapers from a protrusion proximal side to a protrusion distal end side. A distal end portion 134A of the tooth portion 134 curves so as to form a projection to the sprocket radial direction outer side.

Each tooth portion 134 is inserted into and engaged with an engaging recess portion 142 of the rubber crawler 140 (see FIG. 11). Specifically, as shown in FIG. 11, a sprocket circumferential direction angled face of the tooth portion 134 with a flat shape (a pushing face 134B) engages with (abuts against) a crawler peripheral direction wall face of the engaging recess portion 142, and driving force from the sprocket 132 is transmitted to the rubber crawler 140 via the engaging recess portion 142.

As shown in FIG. 9B, sprocket width direction outer side portions of the distal end portion 134A of each tooth portion 134 are cut away, forming flat surfaces 134D at the sprocket radial direction inner side relative to the distal end portion 134A. As shown in FIG. 9A, each flat surface 134C extends in a direction orthogonal to the sprocket radial direction in the sprocket side view. This flat surface 134C is an example of a supported surface of the present invention.

The sprocket 132 according to the present exemplary embodiment is a casting in which the wheel portion 102 and the tooth portions 134 are formed integrally.

—Rubber Crawler—

Now, the rubber crawler 140 according to the present exemplary embodiment is described.

In the present exemplary embodiment, the same as in the first exemplary embodiment, the peripheral direction, width direction, inner side and outer side of the rubber crawler 140 are referred to as the crawler peripheral direction, the crawler width direction, the crawler inner side and the crawler outer side, respectively.

As shown in FIG. 10 and FIG. 11, the rubber crawler 140 is equipped with the rubber body 16 with the same structure as in the first exemplary embodiment and the cores 20 embedded in the rubber body 16 that are spaced apart in the crawler peripheral direction (at a constant spacing in the present exemplary embodiment). Each core 20 has the same structure as in the first exemplary embodiment. The width direction, peripheral direction, inner side and outer side of the rubber body 16 of the present exemplary embodiment coincide with the crawler width direction, the crawler peripheral direction, the crawler inner side and the crawler outer side, respectively.

At the inner periphery portion of the rubber body 16, the wheel portion support faces 30 and track roller passing surfaces 36 are formed with the same structures as in the first exemplary embodiment. At the outer periphery portion of the rubber body 16, the long lugs 38 and short lugs 40 are formed with the same structures as in the first exemplary embodiment. Inside the rubber body 16 is embedded the reinforcement layer 42 with the same structure as in the first exemplary embodiment.

As shown in FIG. 10 and FIG. 11, the engaging recess portions 142 are formed at the inner periphery portion of the rubber body 16 as pairs sandwiching the wheel portion support faces 30 at both the crawler width direction outer sides of the wheel portion support faces 30. Each engaging recess portion 142 is foamed between two of the protrusions 24 that are mutually adjacent in the crawler peripheral direction. The tooth portions 134 of the sprocket 132 are inserted into and engaged in the engaging recess portions 142, which are recessed toward the crawler outer side.

As shown in FIG. 10, each crawler width direction side wall structuring the engaging recess portions 142 is formed in a step shape with a narrower width at the crawler outer side than at the crawler inner side. A step surface 144 that is formed at this side wall has a flat shape, makes contact with the flat surface 134C of the tooth portion 134 inserted into the engaging recess portion 142, and supports the tooth portion 134. This step surface 144 is an example of the tooth portion support face of the present invention. The flat surface 134C of the tooth portion 134 and the step surface 144 of the engaging recess portion 142 are formed in mutually corresponding shapes.

The depth of each engaging recess portion 142 of the present exemplary embodiment is specified to be a depth at which, in a state in which the flat surface 134C makes contact with the step surface 144 of the engaging recess portion 142 and the tooth portion 134 is supported, the distal end portion 134A of the tooth portion 134 does not abut against a floor face 142A of the engaging recess portion 142.

In alternative embodiments of the present invention, the depth of the engaging recess portion 142 may be specified to be a depth at which the distal end portion 134A of the tooth portion 134 makes contact with the floor face 142A of the engaging recess portion 142 in the state in which the flat surface 134C makes contact with the step surface 144 of the engaging recess portion 142 and the tooth portion 134 is supported, or may be specified to be a depth at which the distal end portion 134A of the tooth portion 134 makes contact with the floor face 142A only if wear of the wheel portion support face 30 and the step surface 144 is advanced.

As shown in FIG. 11, the pushing face 134B of the tooth portion 134 engages with (abuts against) a crawler peripheral direction wall face of the engaging recess portion 142.

As shown in FIG. 11, in the rubber crawler 140 according to the present exemplary embodiment, the same as in the rubber crawler 14 according to the first exemplary embodiment, surfaces of the protrusions 24 are covered with a thin rubber film when the rubber crawler 140 is new. Therefore, when the rubber crawler is new, the crawler peripheral direction wall face of each engaging recess portion 142 is structured with a rubber film covering the protrusion proximal side of the angled face of the protrusion 24. After the rubber crawler has been used to some extent and the rubber film covering the protrusion proximal side of the angled face of each protrusion 24 has been stripped off, the wall face is structured by the protrusion proximal side of the angled face of the protrusion 24. The present invention is not limited to the structure described above; the rubber layer may be stripped from the surface of each protrusion 24 before the rubber crawler 140 is shipped.

Next, operation and effects of the crawler traveling device 130 of the third exemplary embodiment are described.

Operations and effects of the present exemplary embodiment that are the same as operations and effects of the first exemplary embodiment are not described here.

As shown in FIG. 10, in the crawler traveling device 130, when the tooth portions 134 of the sprocket 132 are inserted into the engaging recess portions 142, the flat surface 134C of each tooth portion 134 makes contact with and is supported by the step surface 144 of the engaging recess portion 142. In this case, the flat surface 134C of the tooth portion 134 and the step surface 144 of the engaging recess portion 142 have mutually corresponding shapes. Therefore, a distribution of loads from the sprocket 132 received by the step surface 144 may be made nearly uniform. Thus, incidences of wear of the step surface 144, particularly uneven wear, may be suppressed. Moreover, because a contact area between the sprocket 132 and the wheel portion support faces 30 and step surfaces 144 is increased, the progress of wearing of the wheel portion support faces 30 may be further suppressed.

In the third exemplary embodiment, the flat surface 134C formed at each tooth portion 134 is an example of the supported face of the present invention, and the step surface 144 formed at each engaging recess portion 142 is an example of the tooth portion support face. However, the present invention is not limited to this structure. Provided the supported face and the tooth portion support face have mutually corresponding shapes, any shapes may be employed. For example, these surfaces may have shapes according to the first to third variant examples shown in FIG. 12 to FIG. 14, which are described below.

Figure 12:
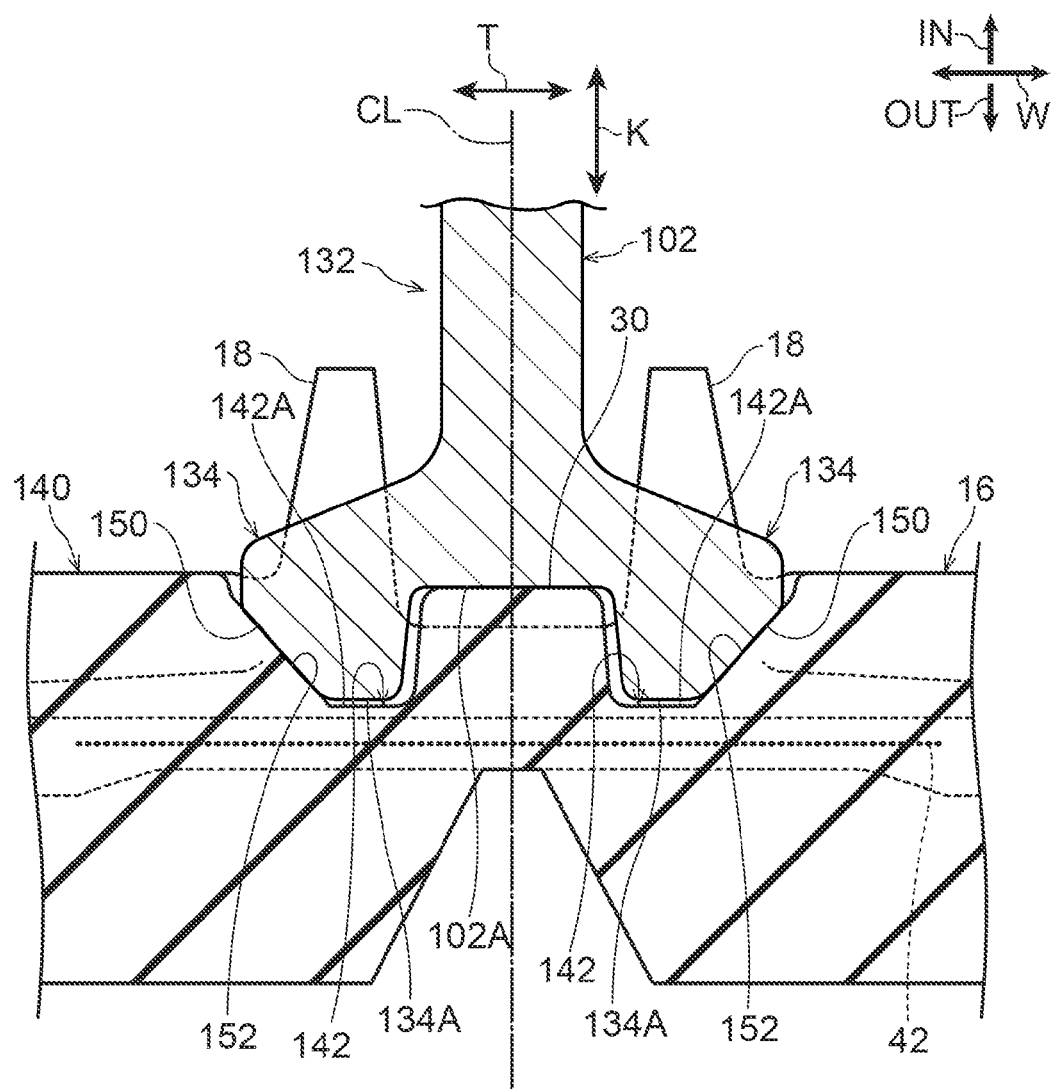
FIG. 12 is a sectional view taken along the crawler width direction of an elastic crawler, showing a state in which a tooth portion of a driving wheel of a first variant example of the crawler traveling device in accordance with the third exemplary embodiment is inserted into and engaged with an engaging recess portion of the elastic crawler.

In the first variant example, shown in FIG. 12, sprocket width direction outer side portions of the distal end portion 134A of each tooth portion 134 are cut away diagonally from the sprocket width direction inner sides to the sprocket width direction outer sides to form angled faces 150 (an example of the supported face) with a flat shape. At least a portion of the side walls at the crawler width direction outer sides of the engaging recess portion 142 are angled to form angled faces 152 (an example of the tooth portion support face) so as to correspond with the angled faces 150. As shown in FIG. 12, the angled faces 150 of the tooth portion 134 are supported by the angled faces 152 of the engaging recess portion 142. In this case, because each angled face 150 of the tooth portion 134 and the angled face 152 of the engaging recess portion 142 are touching, a contact area may be increased relative to, for example, a structure in which a flat face along the sprocket width direction and a flat face along the crawler width direction are touching.

Figure 13:
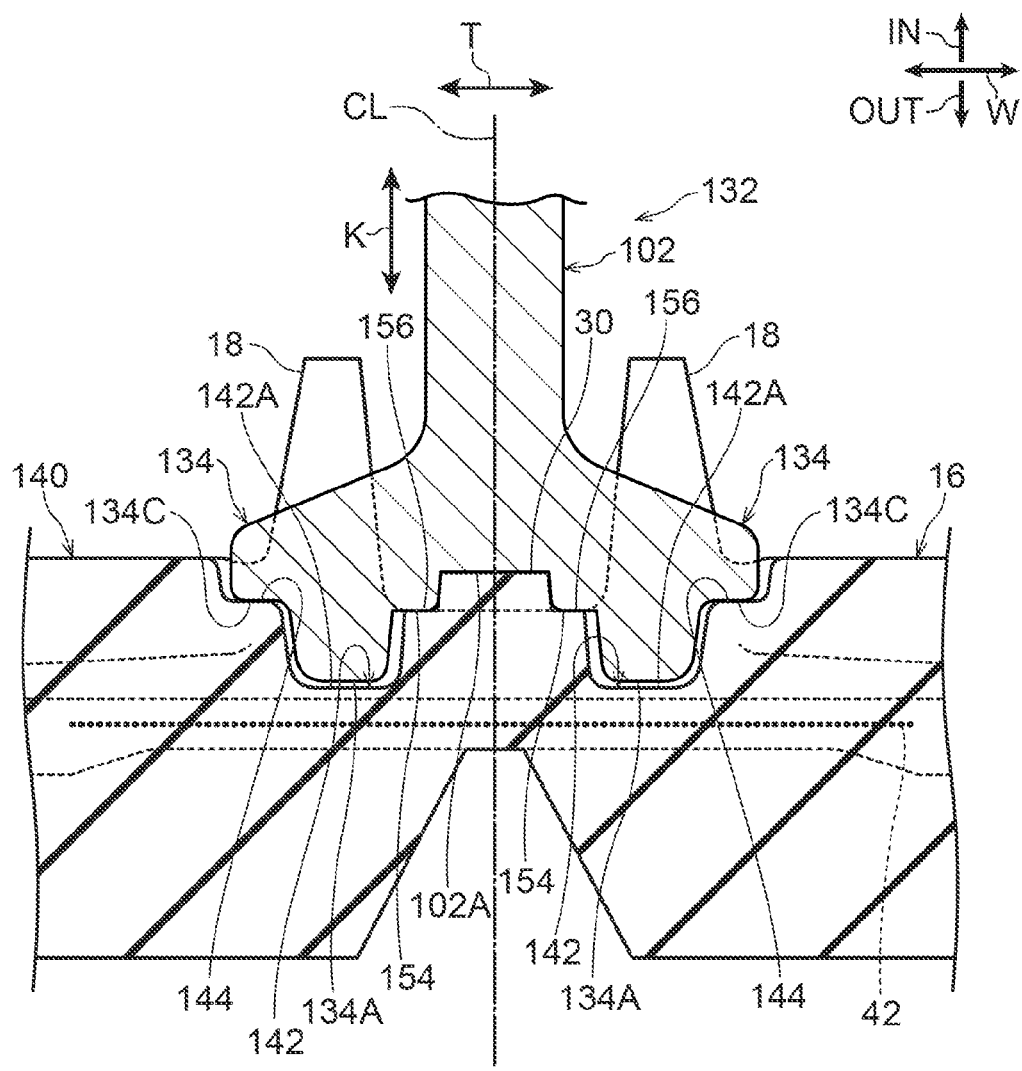
FIG. 13 is a sectional view taken along the crawler width direction of an elastic crawler, showing a state in which a tooth portion of a driving wheel of a second variant example of the crawler traveling device in accordance with the third exemplary embodiment is inserted into and engaged with an engaging recess portion of the elastic crawler.

In the second variant example, shown in FIG. 13, sprocket width direction inner side portions of the distal end portion 134A of each tooth portion 134 are cut away to form flat surfaces 154 (an example of the supported face) that are disposed at the sprocket radial direction inner sides relative to the distal end portions 134A. Similarly to the flat surfaces 154, the flat surfaces 154 extend in the direction orthogonal to the sprocket radial direction in the sprocket side view. Step surfaces 156 (an example of the tooth portion support face) are formed at the crawler width direction inner sides of the engaging recess portion 142 so as to correspond with the flat surfaces 154. As shown in FIG. 13, the flat surfaces 134C of the tooth portion 134 are supported by the step surfaces 156 of the engaging recess portion 142. In this case, because each flat surface 134C of the tooth portion 134 and the step surface 144 of the engaging recess portion 142 and each flat surface 154 of the tooth portion 134 and the step surface 156 of the engaging recess portion 142 are respectively touching, a contact area may be increased relative to, for example, a structure in which one or other of a flat face and a step face are touching.

In the second variant example, as shown in FIG. 13, each sprocket width direction inner side portion of the distal end portion 134A of the tooth portion 134 is cut away such that a distance between the flat surface 154 and the distal end portion 134A is shorter than the distance between the flat surface 134C and the distal end portion 134A. However, the present invention is not limited to this structure. The same may be cut away such that the distance between the flat surface 154 and the distal end portion 134A is longer than the distance between the flat surface 134C and the distal end portion 134A, and may be cut away such that the distances are equal.

The crawler traveling device 130 may also be formed with a structure in which only the flat surfaces 154 are formed at each tooth portion 134 and only the step surfaces 156 are formed at each engaging recess portion 142.

Figure 14:
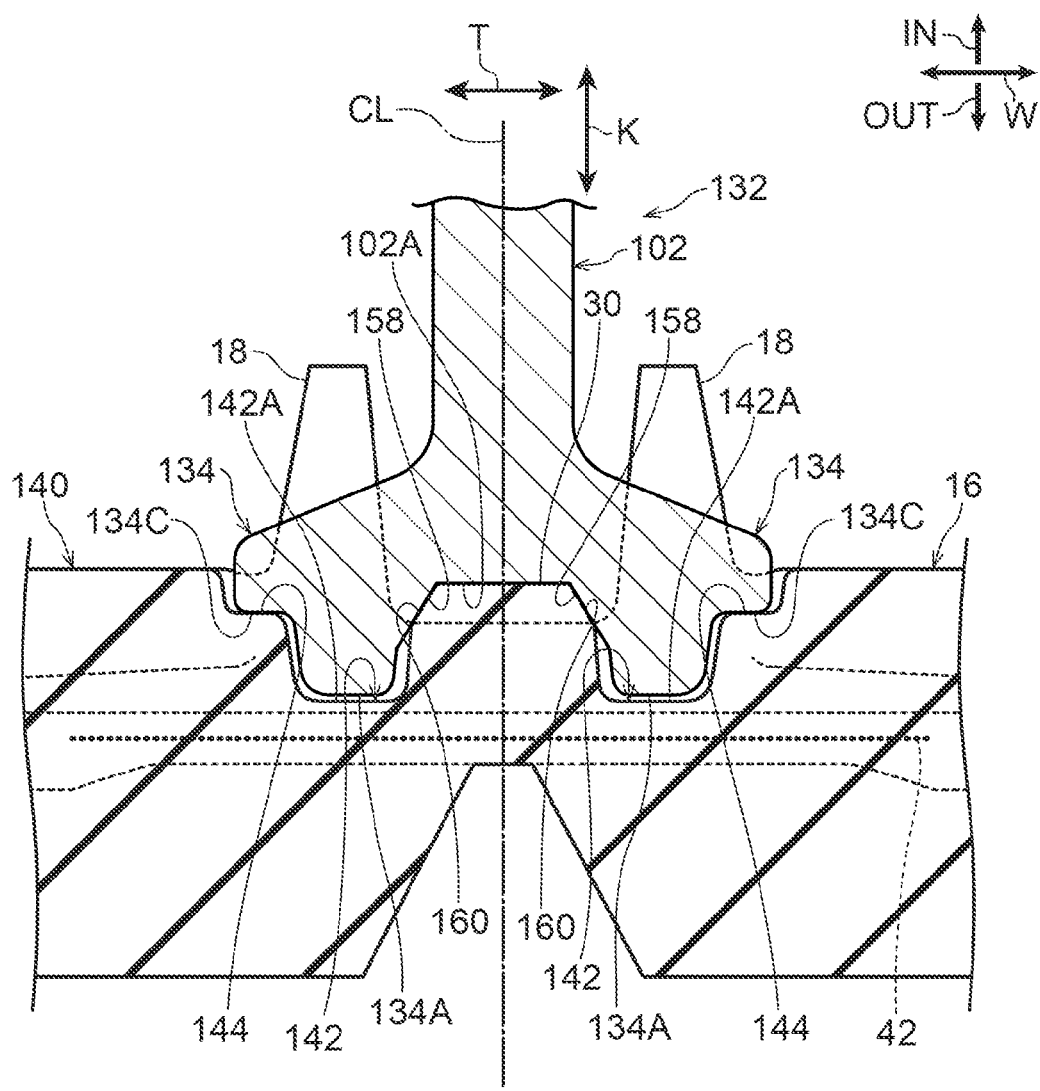
FIG. 14 is a sectional view taken along the crawler width direction of an elastic crawler, showing a state in which a tooth portion of a driving wheel of a third variant example of the crawler traveling device in accordance with the third exemplary embodiment is inserted into and engaged with an engaging recess portion of the elastic crawler.

In the third variant example, shown in FIG. 14, sprocket width direction inner side portions of the distal end portion 134A of each tooth portion 134 are cut away diagonally from the sprocket width direction outer sides to the sprocket width direction inner sides to form angled faces 158 (an example of the supported face) with a flat shape. At least a portion of each side wall at the crawler width direction inner side of the engaging recess portion 142 is angled to form an angled face 160 (an example of the tooth portion support face) so as to correspond with the angled face 158. As shown in FIG. 14, the angled faces 158 of the tooth portion 134 are supported by the angled faces 160 of the engaging recess portion 142. In this case, because each flat surface 134C of the tooth portion 134 and the step surface 144 of the engaging recess portion 142 and each angled face 158 of the tooth portion 134 and the angled face 160 of the engaging recess portion 142 are respectively touching, a contact area may be increased relative to, for example, a structure in which either the flat surface 134C and the step surface 144 are touching or the angled face 158 and the angled face 160 are touching.

The crawler traveling device 130 may also be formed with a structure in which only the angled faces 158 are formed at each tooth portion 134 and only the angled faces 160 are formed at each engaging recess portion 142.

In the sprocket 132 according to the third variant example, a structure in which each tooth portion 134 at the other side portion of the wheel portion 102 is disposed midway between mutually adjacent tooth portions 134 at the one side portion, the same as in the sprocket 100 according to the first exemplary embodiment, may be employed.

The structure of the second exemplary embodiment in which the sprocket is divided may be applied to the sprocket 132 of the third exemplary embodiment. If the sprocket 132 is divided, the divided members may be formed by forging, the same as in the second exemplary embodiment, and may be formed by casting.

Alternative Exemplary Embodiments

The tooth portion 116 according to the second exemplary embodiment is a structure that is a block body with a substantially triangular shape in the sprocket side view (viewed in the sprocket width direction) that tapers from the protrusion proximal side to the protrusion distal end side and of which the distal end portion of the tooth portion 116 curves so as to form a projection to the sprocket radial direction outer side. However, the present invention is not limited to this structure, and the structure of a tooth portion 162 shown in FIG. 15A and FIG. 15B may be employed. As shown in FIG. 15A and FIG. 15B, a portion of the tooth portion 162 that is demarcated by portions structuring a distal end portion 162A and a pushing face 162B is formed as a reduced thickness portion 164. In other words, a central portion of the tooth portion 162 with the block shape forms the reduced thickness portion 164 that is recessed to the sprocket radial direction inner side. Thus, because the reduced thickness portion 164 is formed at the tooth portion 162, the weight of the tooth portion 162 may be reduced, and the weight of the sprocket 112 may be reduced. Hence, the weight of the crawler traveling device 110 may be reduced.

The structure of the tooth portion 162 (the structure in which the reduced thickness portion 164 is formed) may also be employed in the first exemplary embodiment and the third exemplary embodiment.

The exemplary embodiments described hereabove have structures in which the line passing through the crawler width direction centers of the cores 20 matches the line passing through the crawler width direction centers of the rubber body 16, but the present invention is not limited to this structure. The above-mentioned line of the cores 20 may be offset in the crawler width direction relative to the above-mentioned line of the rubber body 16.

In the exemplary embodiments described above, the reinforcement layer 42 for reinforcement of the rubber crawler 14 is embedded therein, but the present invention is not limited to this structure. Rather than using the reinforcement layer 42, a structure may be formed in which the cores 20 that are mutually adjacent in the crawler circumferential direction are connected to one another by a connecting member (for example, a ring-shaped connecting member or the like), or connecting members formed at the cores (for example, hooks and pins or the like) are connected to one another, and thus the rubber crawler 14 is reinforced by the cores being connected to form an endless shape.

In the exemplary embodiments described above, the rubber body 16 is formed of a rubber as an example of the elastic body, but the present invention is not limited to this structure. Apart from rubber, the rubber body 16 may be formed of an elastomer or the like.

In the exemplary embodiments described above, the cores 20 are fabricated of metal, but the present invention is not limited to this constitution. Provided strength sufficient for the specifications of the rubber crawler 14 is provided, the cores 20 may be fabricated of, for example, resin.

In the foregoing, exemplary embodiments of the present invention have been illustrated and the exemplary embodiments have been described. However, these embodiments are examples and numerous modifications may be embodied within a scope not departing from the spirit of the invention. It will be clear that the technical scope of the present invention is not to be limited by these exemplary embodiments.

The invention claimed is:

1. A crawler traveling device comprising:
   a driving wheel comprising:
   a wheel portion mounted to a driving axle, and
   tooth portions that are provided, spaced apart in a circumferential direction of the wheel portion, at side portions of the wheel portion, the tooth portions protruding in a radial direction from an outer periphery face of the wheel portion; and
   an elastic crawler comprising:
   an elastic body in an endless shape that is wrapped round the driving wheel,
   a wheel portion support face that is provided at an inner periphery portion of the elastic body and supports the outer periphery face of the wheel portion, and
   engaging recess portions that are provided, spaced apart in the circumferential direction, at both width direction sides of the inner periphery portion to sandwich the wheel portion support face, and that are recessed toward the outer periphery side with respect to the wheel portion support face, the tooth portions being inserted into and engaged with the engaging recess portions.

2. The crawler traveling device according to claim 1, wherein tooth portion support faces that support the tooth portions are formed at the engaging recess portions.

3. The crawler traveling device according to claim 2, wherein:
the tooth portion support faces are formed at width direction side walls structuring the engaging recess portions, and
supported faces to be supported at the tooth portion support faces formed at the side walls are formed at the tooth portions.

4. An elastic crawler comprising:
an elastic body in an endless shape adapted to be wrapped round a driving wheel;
cores that are embedded in the elastic body, spaced apart in an elastic body peripheral direction, and that extend in an elastic body width direction, a pair of protrusions that protrude to an elastic body inner side being formed at each core at both elastic body width direction sides sandwiching an elastic body width direction central portion of the core;
wheel portion support faces that are formed between the central portions of the cores that are mutually adjacent in the elastic body peripheral direction of the elastic body, the wheel portion support faces being disposed at the elastic body inner side relative to the central portions and supporting the driving wheel; and
engaging recess portions that are formed at both elastic body width direction sides, sandwiching the wheel portion support faces of the elastic body, between the protrusions of the cores that are mutually adjacent in the elastic body peripheral direction, the engaging recess portions being recessed toward the elastic body outer side with respect to the wheel portion support face, and disposed so as to receive tooth portions that are provided at an outer periphery of the driving wheel.

* * * * *